United States Patent
Hackett

(10) Patent No.: US 10,738,367 B2
(45) Date of Patent: Aug. 11, 2020

(54) METHOD FOR HOMOGENIZING STEEL COMPOSITIONS

(71) Applicant: TerraPower, LLC, Bellevue, WA (US)

(72) Inventor: Micah J. Hackett, Seattle, WA (US)

(73) Assignee: TerraPower, LLC, Bellevue, WA (US)

( * ) Notice: Subject to any disclaimer, the term of this patent is extended or adjusted under 35 U.S.C. 154(b) by 362 days.

(21) Appl. No.: 15/609,377

(22) Filed: May 31, 2017

(65) Prior Publication Data

US 2018/0245174 A1 Aug. 30, 2018

Related U.S. Application Data

(60) Provisional application No. 62/464,723, filed on Feb. 28, 2017.

(51) Int. Cl.
*C21D 9/46* (2006.01)
*C21C 5/52* (2006.01)
(Continued)

(52) U.S. Cl.
CPC .............. *C21D 9/46* (2013.01); *C21C 5/5241* (2013.01); *C21C 7/10* (2013.01); *C21D 1/26* (2013.01);
(Continued)

(58) Field of Classification Search
CPC . C21D 9/46; C21D 1/28; C21D 8/041; C21D 8/021; C21D 1/26; C21D 1/42;
(Continued)

(56) References Cited

U.S. PATENT DOCUMENTS

| 5,247,550 A | 9/1993 | Perkins |
| 5,301,218 A | 4/1994 | Taylor |

(Continued)

FOREIGN PATENT DOCUMENTS

| CN | 103940740 A | 7/2014 |
| DE | 102005030433 B3 | 12/2006 |

(Continued)

OTHER PUBLICATIONS

PCT/US2017/035513 International Search Report and Written Opinion, dated Nov. 27, 2017, 17 pgs.
(Continued)

*Primary Examiner* — Anthony J Zimmer

(57) ABSTRACT

This disclosure describes methods for improving the performance and consistency of steels by closely controlling the initial homogenization of steel compositions prior to hot working. Experimental data is provided illustrating that the traditional austenitization techniques do not take into account diffusion of the various components within a steel composition and, as such, may not completely homogenize the steel composition. In the methods described in this disclosure, the initial step of austenitizing the steel ingot is altered to achieve a more homogenous distribution of the different components throughout the ingot. The improved method includes heating the steel composition to a temperature within the upper half of the pure austenitic phase temperature range and maintaining the steel composition at that temperature for a period of time determined based on the diffusivity in the austenitic phase of the steel composition of at least one constituent of the steel.

19 Claims, 19 Drawing Sheets

(51) Int. Cl.

| | |
|---|---|
| *C21D 8/02* | (2006.01) |
| *C21D 1/42* | (2006.01) |
| *C21D 1/26* | (2006.01) |
| *C22C 38/46* | (2006.01) |
| *C22C 38/44* | (2006.01) |
| *C22C 38/42* | (2006.01) |
| *C22C 38/04* | (2006.01) |
| *C22C 38/02* | (2006.01) |
| *C22C 38/00* | (2006.01) |
| *C21D 8/04* | (2006.01) |
| *C21C 7/10* | (2006.01) |
| *C21D 1/28* | (2006.01) |
| *C21D 9/70* | (2006.01) |

(52) U.S. Cl.
CPC .............. *C21D 1/28* (2013.01); *C21D 1/42* (2013.01); *C21D 8/021* (2013.01); *C21D 8/0205* (2013.01); *C21D 8/0226* (2013.01); *C21D 8/0236* (2013.01); *C21D 8/0263* (2013.01); *C21D 8/041* (2013.01); *C22C 38/001* (2013.01); *C22C 38/002* (2013.01); *C22C 38/02* (2013.01); *C22C 38/04* (2013.01); *C22C 38/42* (2013.01); *C22C 38/44* (2013.01); *C22C 38/46* (2013.01); *C21C 2300/08* (2013.01); *C21D 8/0257* (2013.01); *C21D 8/0457* (2013.01); *C21D 9/70* (2013.01); *C21D 2211/001* (2013.01); *Y02P 10/253* (2015.11)

(58) Field of Classification Search
CPC .. C21D 8/0205; C21D 8/0236; C21D 8/0226; C21D 8/0263; C21D 9/70; C21D 8/0457; C21D 8/0257; C21D 2211/001; C21C 7/10; C21C 5/5241; C21C 2300/08; C22C 38/001; C22C 38/002; C22C 38/02; C22C 38/04; C22C 38/42; C22C 38/44; C22C 38/46; Y02P 10/253

See application file for complete search history.

(56) References Cited

U.S. PATENT DOCUMENTS

| | | | |
|---|---|---|---|
| 6,632,298 B1 * | 10/2003 | Morita | B22D 11/00 |
| | | | 148/336 |
| 2007/0089809 A1 * | 4/2007 | Itoh | B22D 11/001 |
| | | | 148/312 |

FOREIGN PATENT DOCUMENTS

| | | |
|---|---|---|
| EP | 1205269 A1 | 5/2002 |
| EP | 1283275 A1 | 2/2003 |
| JP | 09256125 | 9/1997 |

OTHER PUBLICATIONS

PCT International Preliminary Report on Patentability in Application PCT/US20171035513, dated Sep. 12, 2019, 10 pages.

* cited by examiner

US 10,738,367 B2

METHOD FOR HOMOGENIZING STEEL COMPOSITIONS

CROSS REFERENCE TO RELATED APPLICATIONS

The present application claims the benefit of U.S. Provisional Patent Application No. 62/464,723, titled "METHOD FOR HOMOGENIZING STEEL COMPOSITIONS", filed Feb. 28, 2017.

INTRODUCTION

Steel refers to alloys of iron and carbon that are useful in a variety of applications. The last 30 years of development has focused primarily on versions of steel with 8-9 wt. % Cr. While a large number of steels have been developed, very few have become commercially viable.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto. The patent or application file contains at least one drawing executed in color. Copies of this patent or patent application publication with color drawing(s) will be provided by the Office upon request and payment of the necessary fee.

DETAILED DESCRIPTION

One traditional method of hardening steels is to heat a steel ingot to a temperature where the iron phase changes from ferrite into austenite, i.e. changes crystal structure from BCC (body-centered cubic) to FCC (face-centered cubic). The act of heating the steel to austenite is referred to as austenitizing. In the austenitic phase, steel can dissolve substantially more carbon. The austenitic phase temperature range varies depending on the composition and is typically determined from thermodynamic calculations but may also be confirmed experimentally for specific compositions. After reaching the austenitic phase temperature range, the temperature is then maintained for some period of time, usually determined experimentally, that is long enough to ensure that all of the steel composition has completely transitioned into the austenitic phase. Once complete austenitization has been achieved, the material is then quenched with a high cooling rate so that the carbon does not have time to form carbide precipitates. This causes the steel to transition to the martensite phase in which the crystal lattice becomes BCT (body-centered tetragonal) instead of a BCC. After this process, the steel may be hot worked, normalized (which may include a second austenitizing step) and tempered to achieve a final shape and hardness.

Experiments have been performed that show that consistency and strength of steels may be improved by more closely controlling the initial homogenization of steel compositions prior to hot working. The experiments show that the traditional austenitization techniques do not take into account diffusion of the various components within a steel composition and, as such, may not completely homogenize the steel composition.

In the methods described in this disclosure, the initial step of austenitizing the steel ingot is altered to achieve a homogenous distribution of the different components throughout the ingot. To differentiate the traditional austenitizing techniques discussed above from the inventive methods described herein, the initial step using the methods described herein will be referred to as the homogenizing step or, simply, homogenization.

Figure 1:
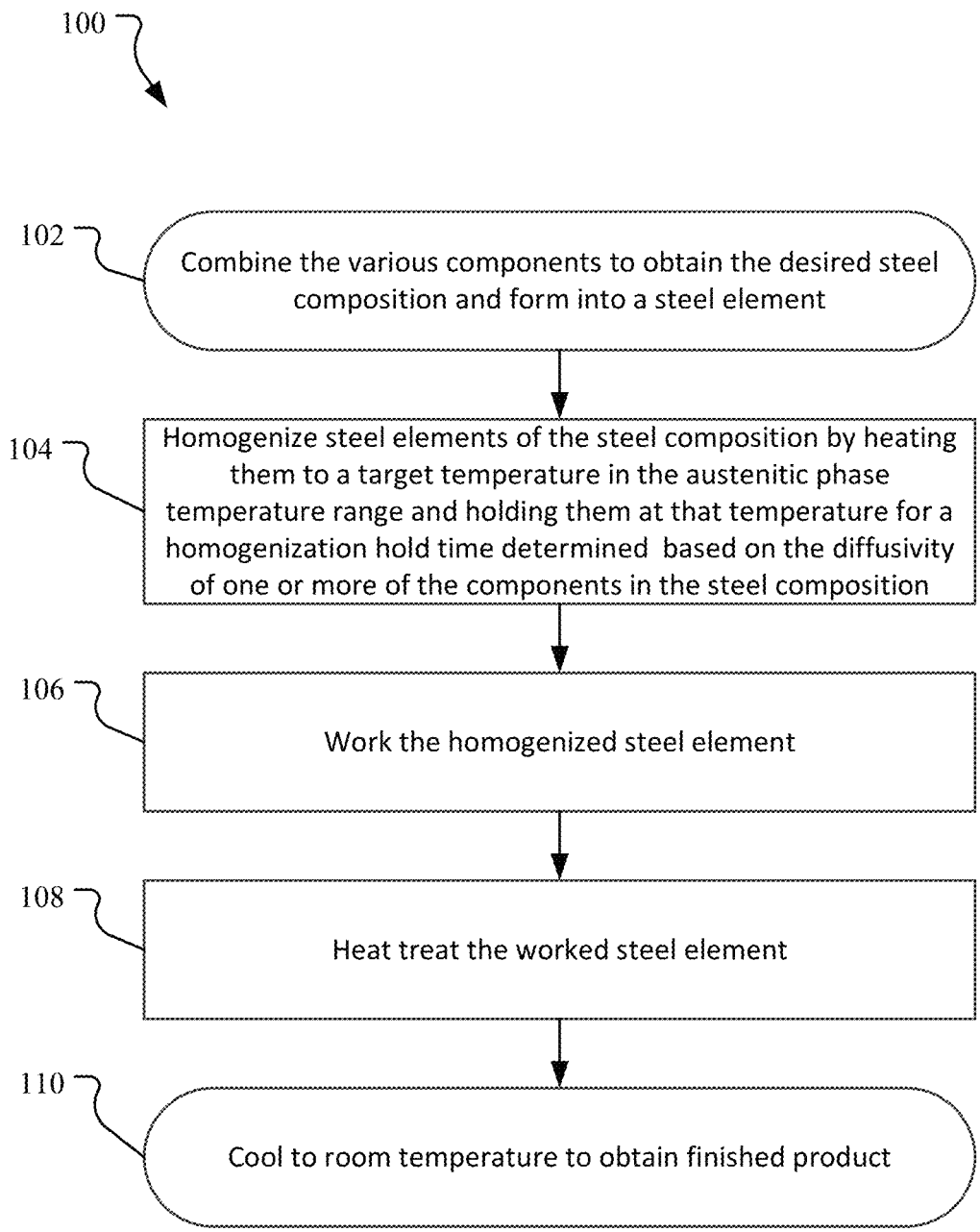
FIG. 1 illustrates, at a high-level, an embodiment of a method of improved homogenization and where it fits in a steelmaking process.

FIG. 1 illustrates, at a high-level, an embodiment of a method of improved homogenization and where it fits in a steelmaking process. In the method 100 shown, the initial steel composition is created by combining the various components in the proportions necessary to obtain the desired steel composition in an initial melting and ingot creation operation 102. This may be done using any suitable technique such as using vacuum induction melting (VIM) or argon-oxygen decarburization (AOD) followed by VIM. Further refining to reduce impurities may or may not be performed, for example by vacuum arc re-melting (VAR) or electro-slag re-melting (ESR) or consumable electrode vacuum arc re-melting (CEVAR) or electron beam melting (EBM). One might also follow VIM with inert gas atomization for powder fabrication in order to use the steel in powder metallurgy applications. For example, in an embodiment, the melting may include VIM of one or more ingots of the steel composition in a vacuum induction furnace for a period of time, forging the ingots into electrodes and re-melting the ingots in a CEVAR furnace. Other melting methods are also suitable.

Figure 2:
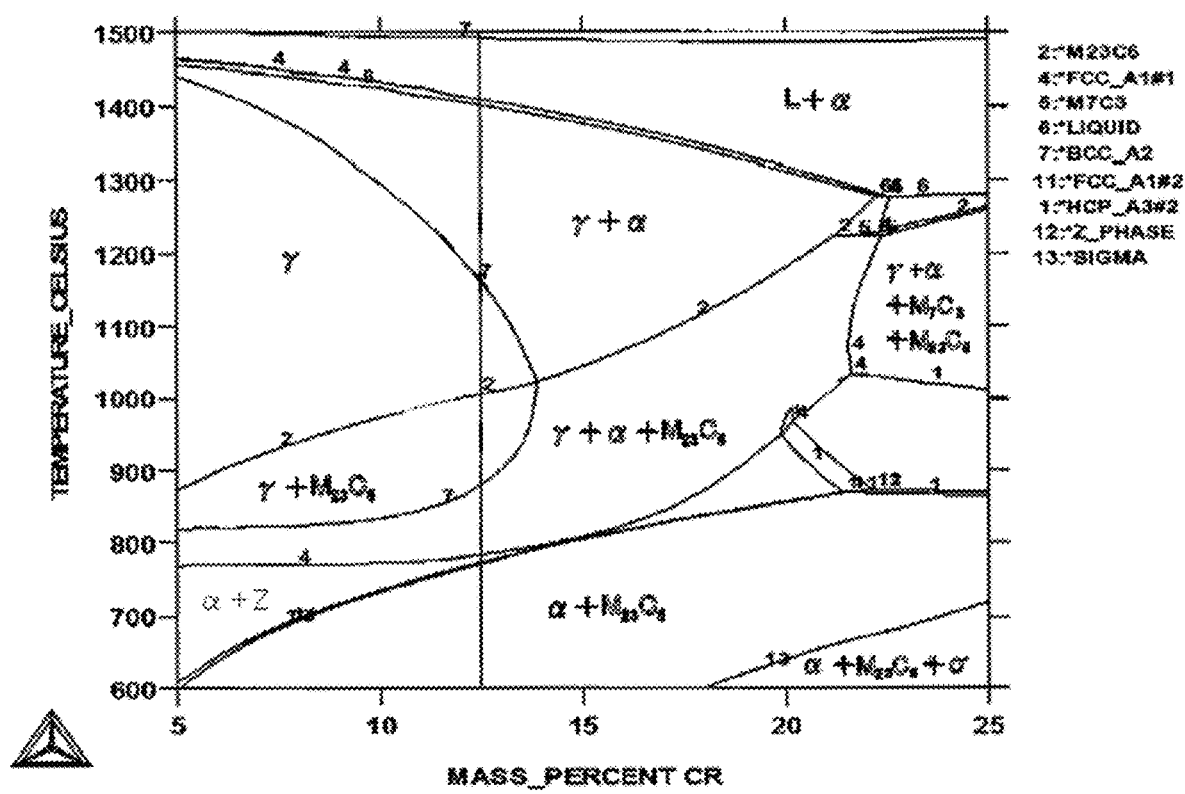
FIG. 2 illustrates a pseudo binary phase diagram for the nominal HT9 steel (Fe—XCr-0.2C) calculated by Thermo-calc™ software.

The initial melting and ingot creation operation 102 includes raising the steel composition to a temperature in which at least some of the steel composition forms the austenitic phase. FIG. 2 illustrates a pseudo binary phase diagram for the nominal HT9 steel (Fe—XCr-0.2C) calculated by Thermo-calc™ software. In FIG. 2, the austenitic phase is represented by the gamma, 'γ', symbol and temperature ranges in which some or all of the steel compositions in the austenitic phase are shown. In some embodiments, the initial melting operation may include a specific austenitization operation in which the steel composition after initial melting is raised to an austenizing temperature and held for some period of time during which at least some of the steel composition transitions into the austenitic phase.

The initial melting and ingot creation operation 102 may include further processing of the steel as part of making the final solid steel product. This may include forging, machining, cutting, grinding, pilgering, or any other manipulations to place the steel ingot into a desired form. In any case, the product of the initial melting and ingot creation operation 102 is a steel element such as a steel ingot, billet, plate, or tube of the steel composition. As part of this operation 102, the steel element may be worked into the desired product shape. The working may be extensive or minimal depending on the desired product.

After the initial melting and ingot creation operation 102, the steel element is then homogenized in a homogenization operation 104. In the operation 104 shown, the steel element is homogenized by heating the steel element to a target temperature within the austenitic phase temperature range for that steel composition and holding the steel element at the target temperature for a homogenization hold time determined based on the diffusivity of one or more of the components in the steel composition.

In the homogenization operation 104, the target temperature is selected based on the steel composition in that, for varying steel compositions, the austenitic phase temperature range is a function of the steel composition. In an embodiment, the temperature is selected to be as high as feasible but still within the austenitic temperature range.

FIG. 2 illustrates a pseudo binary phase diagram for the nominal HT9 steel (Fe—XCr-0.2C) calculated by Thermo-calc™ software. The austenitic phase temperature range is illustrated as the region of solely 'γ' phase. The temperature selection is discussed in greater detail with reference to FIG. 3.

After heating to the target temperature, the steel composition is then held at that temperature in homogenization operation 104. It is during this period of time that the various components within the steel composition fully dissolve and mobilize throughout the ingot to obtain a homogenous steel composition in the austenitic phase. The temperature is held for a period of time (referred to as the "homogenization hold time" or, simply, the "hold time") determined based on the diffusivities of the components in the steel and a target diffusion distance to be achieved. The diffusion distance, d, for any given component of the composition as a function of time, t, and target temperature, T, may be calculated by the following equation:

$$d = \sqrt{D \cdot e^{-Q/kT} \cdot t}$$

where D is the diffusion coefficient of the component in austenitic phase iron (γ-Fe), Q is the activation energy of the component in γ-Fe, and k is Boltzmann's constant.

In an embodiment, the hold time used may be the time calculated from the diffusion equation to achieve a desired diffusion distance for the selected component. As there are multiple components, such as Cr, Mo, Mn, V, W, Ni, Si, Co, Nb, N, etc., in any steel, for any given distance for a particular component, the calculated time will be a function of the component's diffusion coefficient and activation energy. Thus, to determine a particular homogenization hold time to be used in the temperature maintenance operation 108, the component and target diffusion distance are first selected.

For component selection, in one embodiment of the method 100 the least diffusive component in the steel composition is selected. Alternatively, the hold time may be the hold time for a selected component whose homogenous distribution is of particular interest. For example, the selected component may be that which is most likely to segregate based on prior observation or the most segregated component in the ingot as determined prior to the homogenization operation 104.

For target diffusion distance selection, in an embodiment the desired diffusion distance may be selected based on a physical dimension of the steel element, such as the minimum or maximum of the height, width, and length of a solid ingot or plate or a wall thickness of a steel tube. As an example of this embodiment, for a solid 3-dimensional ingot having a longest axis, L, (i.e., the longest straight line that can be drawn between two surfaces of the ingot), the hold time in operation 106 may be that time, t, for which the diffusion distance, d, equals the ingot's longest access, L. Said in another way, the hold time, t, is that time determined by the equation above for the selected component using the ratio d/L=1. In an alternative embodiment, the hold time may be that time resulting from a ratio d/L that is greater than or equal to 0.5, 0.75, 0.9, 1.0, 1.1, 1.25, 1.5, 2.0, or 2.5. Alternatively, the diffusion distance may be selected based on the shortest axis, S, of the solid 3-dimensional ingot and the ratio d/S is used that is greater than or equal to 0.5, 0.75, 0.9, 1.0, 1.1, 1.25, 1.5, 2.0, or 2.5.

In an alternate embodiment, the desired diffusion distance may be selected based on characteristics observed in the steel element prior to the homogenization operation 104 or in prior batches of steel elements of the same composition. For example, in an embodiment the steel element to be homogenized may exhibit observable anisotropies or heterogeneities within the element, such as the banding or segmentation of one or more components of the composition. The desired diffusion distance may then be based on the observed phenomena in order to homogenize and remove the observed heterogeneity, for example, to remove segregation bands of a component in the steel element. For example, segmentation in the form of bands of a particular component may be observed in the ingot. An Example, below, describes such an observed anisotropy for an HT9 steel in the form of Cr banding. The desired diffusion distance may then be selected as a function of the distance between the observed bands, B, of the particular component. Said in another way, the homogenization hold time, t, is that time calculated using the ratio d/B=1 for the component exhibiting the banding. In an alternative embodiment, the hold time may be that time for which the ratio d/B is greater than or equal to 0.5, 0.75, 0.9, 1.0, 1.1, 1.25, 1.5, 2.0, or 2.5.

An upper bound to the homogenization hold time may also be selected to prevent the growth of excessively large grains of austenite during the homogenization method 100. In an embodiment, the upper bound may be selected based on grain size of austenite, e.g., a hold time for which no austenite grains are larger than 1000 µm, 500 µm, 100 µm, or even 50 µm in their longest axis. In an alternative embodiment, the upper limit for the range of the hold time may be selected based on the selected diffusion distance to target distance ratio (e.g., d/L, d/S, d/B, etc.). For example, the hold time's upper limit may be less than or equal to the time, t, for which d/B is 10.0, 5.0, 4.0, 2.5, 2.0 or even 1.5.

Thus, in an embodiment, the homogenization hold time used in the homogenization operation 104 is a length of time calculated using the above equation, for a selected component, for a diffusion distance d, where d is selected based on an observed anisotropy having a characteristic distance B, so that the ratio d/B is from a lower bound of d/B=0.5, 0.75, 0.9, 1.0, 1.1, 1.25, 1.5, 2.0, or 2.5 to an upper bound of d/B=10.0, 5.0, 4.0, 2.5, 2.0 or even 1.5 (excluding, of course, those combinations where the upper bound is less than the lower bound).

After the homogenization hold time has expired, the homogenized steel element is then cooled to the working temperature and worked, either by hot working or cold working, into the final form as desired. This is illustrated by the working operation 106. The working operation 106 may further include one or more ancillary steps normally associated with steel working such as annealing, machining, oxide removal, rolling, pilgering, milling, and extrusion.

The homogenized and worked steel element may then be subjected to a final treatment as shown by the final treatment operation 108. This may include any final treatment processes now known in the art or later developed. For example, a final treatment operation 108 that includes normalization and tempering in order to achieve the final properties of the steel composition may be used. In an embodiment, the final treatment operation 108 may include one or more of the methods described in U.S. Pat. No. 9,303,295, to Hackett, et al., titled IRON-BASED COMPOSITION FOR FUEL ELEMENT, which is incorporated herein by reference. After the final treatment, the steel composition product is then cooled to room temperature and is ready for use. This is illustrated by the cooling operation 110.

The homogenization operation 104 results in a very homogenous ingot as the input to the working operation 108. As the working operation will, itself, de-homogenize the steel element somewhat, the ultimate homogeneity of the final product is improved by improving the homogeneity of the ingot prior to the working operation 106. Although the final treatment operation 108 may assist in partially re-homogenizing the steel composition, only so much re-homogenization can be done at this stage in the manufacturing process. Thus, the method 100 results in an improved homogeneity of the final steel product and, as such, a stronger steel element, regardless of the final treatment used. The method 100 may also allow shorter and/or less expensive final treatments to be used to obtain the same performance, e.g., mechanical properties and irradiation performance, in a final product than could be achieved without the improved homogenization prior to the working operation 106.

Figure 3:
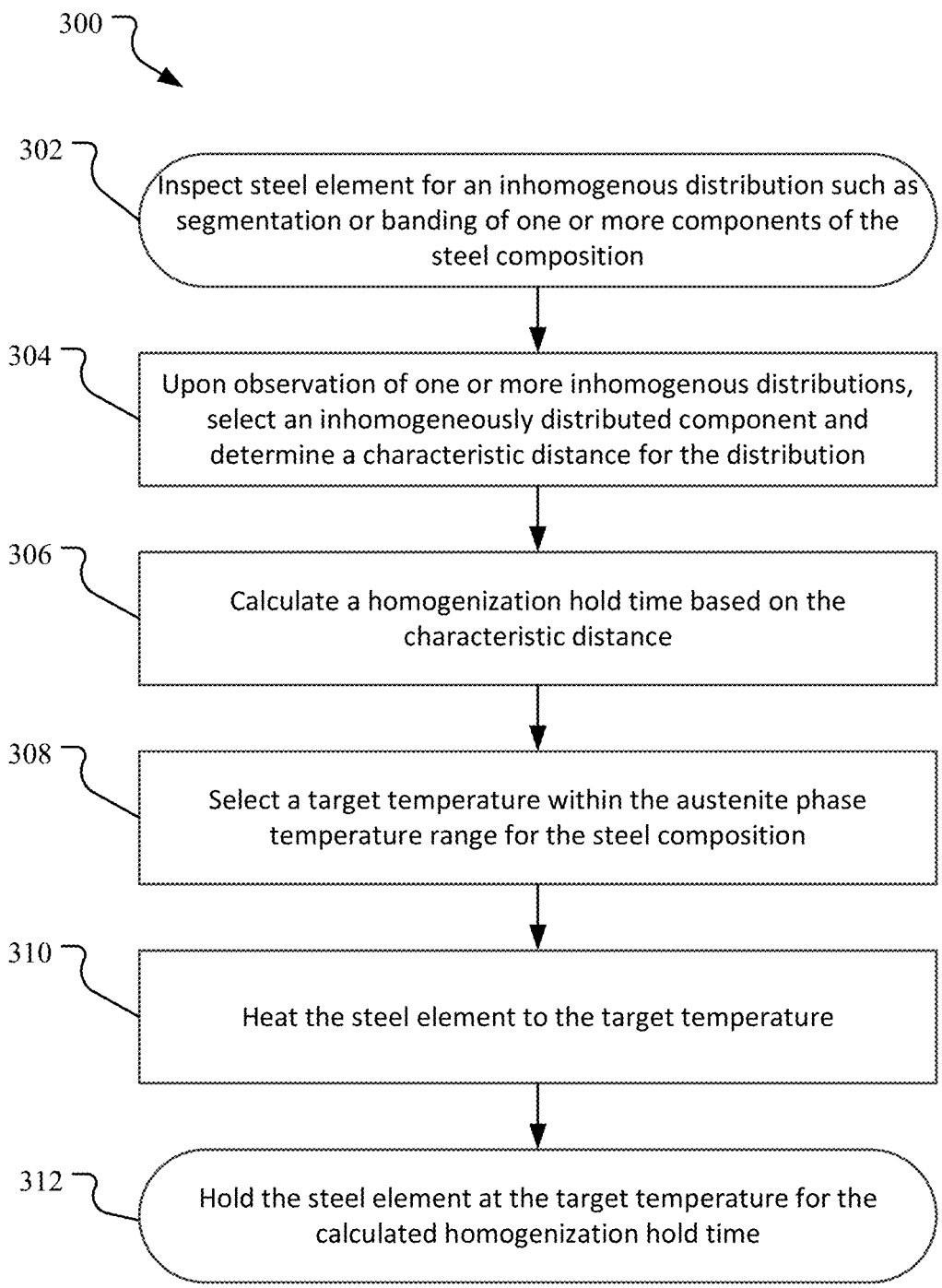
FIG. 3 illustrates an embodiment of the homogenization operation.

FIG. 3 illustrates an embodiment of the homogenization operation 104 of FIG. 1. In the embodiment shown in FIG. 3, a steel element is provided for homogenization and this element is inspected for heterogeneities in an inspection operation 302. In an embodiment, the inspection operation 302 may include optically inspecting the steel element's microstructure after treating the steel element with an etchant to reveal the lath microstructure, such as for tempered martensite and δ-Fe grains.

In an embodiment, etchant treatment may include mechanical polishing prior to immersion or swab etching. The etchants used may be selected to reveal particular microstructures. There are many different etchants and etching techniques known and used in the art to assist in the microscopic examination of carbon and alloy steels. Examples of etchants include 1) electrolytic NaOH, using a 20% aqueous NaOH mixture, 2) superpicral, 3) Vilella's Reagent, 4) Kalling's No. 2, and 5) solutions of picric acid, sodium dodecylbenzenesulfonate, sodium chloride and sodium sulfate.

Optical inspection can be performed by any known technique that can observe the grains in the microstructure. Electron probe micro-analysis (EPMA) is an example of one such technique. Depending on the embodiment and steel compositions involved, light optical microscopy or scanning electron microscopy (SEM) may also be appropriate methods.

The inspection operation 302 is to identify inhomogenous distributions, or heterogeneities, of components in the steel composition within the steel element being inspected. For detected heterogeneities, the component of the heterogeneity and a characteristic distance, B, of the heterogeneity are determined in a characterization operation 304. The characteristic distance may be the distance between regions of high or low concentrations of a component (e.g., Cr-rich bands) or the distance between regions having different phases of material (e.g., regions having relatively high densities of δ-ferrite grains or regions with of relatively large δ-ferrite grains) within the steel element. Such regions may take the form of bands, such as those observed in the Examples, or, more generally, of pockets or zones distributed throughout the steel element. In an embodiment the characteristic distance may be determined by measuring a plurality of distances between neighboring regions of high concentration and using an average of the measured distances as the characteristic distance.

In an alternative embodiment, the inhomogenous distribution may be modelled and a characteristic distance representing the average amount of distance that atoms of the inhomogenously distributed component would need to travel to obtain a homogenous distribution may be determined. Such characterization techniques are known in the art and any suitable technique now known or later developed may be used. In yet another alternative embodiment, the characteristic distance may be a distance based on observed grain sizes.

In the inspection operation 302 more than one heterogeneity may be observed, such as when two different components are exhibiting different banding. In this embodiment, multiple sets of components and characteristic distances may be determined during the characterization operation 304. In this embodiment, the longest hold time may be selected for use during the homogenization method 300 in order to ensure homogenization of both components. However, in an alternative embodiment where minimizing the grain size of austenite is important, using the shorter homogenization hold time for the more diffusive component may be deemed more desirable.

Next, the homogenization hold time is calculated for the one or more detected heterogeneities in a hold time calculation operation 306. As described above with reference to FIG. 1, one equation for calculating hold time is:

$$d = \sqrt{D \cdot e^{-Q/kT} \cdot t}$$

where d is the diffusion distance for any given component of the composition, t is the hold time, T is the target temperature, D is the diffusion coefficient of the component in austenitic phase iron (γ-Fe), Q is the activation energy of the component in γ-Fe, and k is Boltzmann's constant. Thus, given a component, the target temperature and the desired diffusion distance, the proper hold time, t, can be calculated.

In this embodiment, the desired diffusion distance is determined based on the characteristic distance of the heterogeneity. In an embodiment, the desired distance is a function of the characteristic distance, B. For example, in an embodiment the desired diffusion distance is selected to be the characteristic distance. In other words, d/B=1. In an alternative embodiment, the hold time may be that time for which the ratio d/B is greater than or equal to 0.5, 0.75, 0.9, 1.0, 1.1, 1.25, 1.5, 2.0, or 2.5. As mentioned above, an upper bound to the homogenization hold time may also be selected to prevent the growth of excessively large grains of austenite during the homogenization method 300.

The method 300 further includes selecting a target temperature within the austenite phase temperature range for the steel composition in a homogenization temperature selection operation 308. Although illustrated in this embodiment as following the hold time calculation operation 306, the temperature selection operation 308 may be performed at any time prior to the heating operation 310.

As discussed above, the target temperature is selected to be within the upper end of the austenitic phase temperature range. This generally improves the mobility of components within the steel element and, thus, reduces the hold time necessary to allow for homogenization. In an embodiment, the target temperature is in the upper 50%, upper 25%, upper 20%, upper 15%, upper 10%, upper 5% or even upper 1% of the austenitic phase temperature range.

For example, FIG. 2 illustrates a pseudo binary phase diagram for the nominal HT9 steel (Fe—XCr-0.2C) calculated by Thermo-calc™ software. The phase diagram illustrates that for 12.5 wt. % Cr the austenitic phase (identified by the symbol 'γ' in the diagram) temperature range is from about 1000° C. to 1200° C. In the heating operation 104, for the HT9 composition the target temperature would be selected to be in the upper 50% (i.e., from 1100 to 1200° C.), upper 25% (i.e., from 1150 to 1200° C.), upper 20% (i.e., from 1110 to 1200° C.), upper 15% (i.e., from 1170 to 1200° C.), upper 10% (i.e., from 1180 to 1200° C.), upper 5% (i.e., from 1190 to 1200° C.), or even upper 1% (i.e., from 1198 to 1200° C.) of the austenitic phase temperature range.

However, it has been determined that a target temperature that is too high might allow grains of δ-ferrite phase (identified by the symbol 'α' in the diagram) to form which would be detrimental to the homogenization of the steel composition. Under ideal conditions, the target temperature would be the highest temperature for a particular steel composition for which no δ-ferrite phase is created, that is, just at or below the upper limit of the calculated or experimentally-determined austenitic phase temperature range. But to account for the real world limitations of the current manufacturing technology and the inherent margins of error in the processing techniques, an upper limit to the target temperature less than the upper limit of the austenitic phase temperature range may be selected to provide a margin of safety against the formation of δ-ferrite. In an embodiment, the upper limit of the acceptable range of target temperatures may be selected to be 5° C. less than the upper limit of the calculated austenitic phase temperature range. A larger margin of safety may be 10° C., 15° C., or even 20° C. less than the upper limit of the calculated austenitic phase temperature range. In an alternative embodiment, the margin of safety may be based on the temperature of the upper bound of the austenitic phase temperature range. For example, in an embodiment the margin of safety may be 0.01%, 0.02%, 0.025%, 0.03%, 0.04%, 0.05%, 0.06%, 0.07%, or even 0.075% less than the upper limit of the calculated austenitic phase temperature range. For example, if the upper limit of the calculated austenitic phase temperature range is 1250° C. and the margin of safety is 0.02%, then the homogenization temperature will be 1225° C.

The method 300 heats the steel element to the selected homogenization temperature in a heating operation 310. This may be done in any preferred type of furnace, may be done under an inert atmosphere and may be done at any desired pressure. The steel element is then held at the target temperature for the calculated homogenization hold time in a temperature maintenance operation 312. At this point, the homogenization is complete and the steel element may be cooled and then further processed as described with reference to FIG. 1.

In an embodiment, some of the initial characterization and calculation steps of the method 300 may be performed on a representative steel element in order to characterize the steel composition. Then the heating and maintaining operations are applied to any steel elements of that particular composition without further characterization. For example, a steel element may be made from a portion of a large heat of steel and then subjected to the characterization and calculation operations, e.g., the inspection operation 302, the characterization operation 304, the calculation operation 306, and the selection operation 308, to determine the appropriate homogenization parameters (temperature, hold time) for the steel elements made out of the rest of the heat of steel. Likewise, the same homogenization parameters may be used for additional heats created later but having the same or nearly the same steel composition as the analyzed steel element.

EXAMPLES

Samples of HT9 steel were manufactured and evaluated to determine the effect of the variation of homogenization times and temperatures and to correlate them to diffusion distances. The following Table 1 is a table of HT9 steels evaluated. At first, three alloy types of HT9 steel, which are compositions A, B and D, were melted in 50 kVA type vacuum induction furnace. The compositions of these ingots include: the nominal composition of HT9 steel (Alloy Heat A), the lower range of Cr equivalent composition in HT9 steel (Alloy Heat B), and the upper range of Cr equivalent composition with modified Mo content in HT9 steel (Alloy Heat D).

TABLE 1

| HT9 | Range | C | Si | Mn | P | S | Cr | Mo | Ni | V | W | Cu | N | Net $Cr_{eq}$ |
|---|---|---|---|---|---|---|---|---|---|---|---|---|---|---|
| Type A | Upper | 0.210 | 0.18 | 0.68 | 0.01 | 0.003 | 11.70 | 0.95 | 0.65 | 0.28 | 0.55 | 0.02 | 0.023 | |
| | Lower | 0.190 | 0.12 | 0.62 | | | 11.30 | 0.85 | 0.55 | 0.22 | 0.45 | | 0.017 | |
| | Target | 0.200 | 0.15 | 0.65 | Tr. | Tr. | 11.50 | 0.90 | 0.60 | 0.25 | 0.50 | 0.01 | 0.020 | 7.19 |
| | Result | 0.198 | 0.16 | 0.64 | <0.005 | 0.0018 | 11.58 | 0.90 | 0.61 | 0.25 | 0.51 | 0.01 | 0.023 | 7.33 |
| Type B | Upper | 0.230 | 0.13 | 0.83 | 0.01 | 0.003 | 11.20 | 0.75 | 0.75 | 0.23 | 0.45 | 0.03 | 0.033 | |
| | Lower | 0.210 | 0.07 | 0.77 | | | 10.80 | 0.65 | 0.65 | 0.17 | 0.35 | 0.01 | 0.027 | |
| | Target | 0.220 | 0.10 | 0.80 | Tr. | Tr. | 11.00 | 0.70 | 0.70 | 0.20 | 0.40 | 0.02 | 0.030 | 3.08 |
| | Result | 0.214 | 0.11 | 0.79 | <0.005 | 0.0017 | 11.03 | 0.71 | 0.71 | 0.20 | 0.41 | 0.02 | 0.031 | 3.44 |
| Type D | Upper | 0.19 | 0.23 | 0.53 | 0.01 | 0.003 | 12.2 | 1.05 | 0.55 | 0.33 | 0.65 | 0.02 | 0.013 | |
| | Lower | 0.17 | 0.17 | 0.47 | | | 11.8 | 0.95 | 0.45 | 0.27 | 0.55 | | 0.007 | |
| | Target | 0.18 | 0.20 | 0.50 | Tr. | Tr. | 12.00 | 1.00 | 0.50 | 0.30 | 0.60 | Tr. | 0.010 | 10.90 |
| | Result | 0.176 | 0.21 | 0.50 | <0.005 | 0.0017 | 12.12 | 1.01 | 0.52 | 0.30 | 0.60 | <0.01 | 0.011 | 11.17 |

A 50 kg VIM ingot of each of the three heat, A, B, and D, was heated at 1,200° C. for 48 hours to homogenize the cast structure and then was forged to approximately 70 t×100 w×450 L (mm). The temperature of furnace for homogenizing was controlled by PID temperature controller and by using calibrated thermocouple. The forged plates were then soaked at 1,200° C. for 2 hours and hot-rolled from 70 t×100 w×450 L (mm) to approximately 24 t×110 w×1,050 L (mm).

A portion of the hot-rolled steel plates were then annealed at 800° C. for 1 hour in order to make easy surface machining and approximately 0.3 mm per side was machined off the surface plate to remove any oxide film. The plate was then cold-rolled to a thickness of 5.4 mm by multiple steps. At the intermediate passes during cold rolling, the plate was annealed at 800° C. for 1 hour for softening cold-worked structure. Again, the furnace temperature for intermediate heat treatment is controlled by the PID temperature controller of furnace and by using calibrated thermocouple.

After cold rolling, the plates were annealed at 800° C. for 1 hour in order to make easy sawing and was cut to smaller pieces for final heat treatment. After cutting, final heat treatment was performed for on one of the smaller pieces from each heat. The specimens were heat-treated at 1,000° C. and 1,025° C. for respectively 30 minute, 1,050° C. for 5, 15, 30 and 60 minutes, 1,075° C. for 15 and 30 minutes and 1,100° C. for 10 minute for normalizing and then air-cooled to room temperature in order to obtain martensite structure. The temperature of furnace for normalization heat treatment was controlled by PID temperature controller and by using calibrated thermocouple. Furthermore, new thermocouples were attached by spot welding on the surface of one of the pieces in the heat treatment batch. The batch including the piece attached to thermocouples was put in the furnace at the normalization temperature, and final normalization heat treatment time started to count after thermocouples attached on piece reached the normalization temperature. After holding for prescribed time, the batch was taken out of the furnace.

The normalized specimens were heat-treated at 625° C. for 3 hours, 650° C. for 1 and 3 hours, 675° C. for 2 hours, 700° C. for 1 and 2 hours, 725° C. for 0.5 hour and 750° C. for 0.5 hour in order to temper the martensite structure, and then were air-cooled to room temperature. The temperature of furnace for final temper heat treatment was controlled by PID temperature controller and by using calibrated thermocouple. Again, one of the specimens in the batch included a piece with attached thermocouples as described above. The batch was put in the furnace kept at the tempering temperature, and final tempering treatment time started to count after thermocouples attached on piece reached the tempering temperature. After holding for 30 minutes, the tempered batch was taken out of the furnace.

Steel element sample preparation was started by mechanical polishing with SiC to 1200 grit, followed by polishing with 3 µm diamond paste, and finishing with Leco 0.05 µm colloidal silica. The samples were then etched with one of the following: 1) electrolytic NaOH, using a 20% aqueous NaOH mixture, where the sample is held with Pt-tipped tweezers approximately 1" from the graphite counter-electrode and submerged for 20 seconds using 20 V, 2) superpicral, using 4 g picric acid and 4 mL of HCl in a 100 mL ethanol solution, with an etch time of 20 seconds or less, 3) Vilella's Reagent, using 1 g picric acid with 5 mL hydrochloric acid in a 100 mL ethanol solution, using a swab etch, and 4) Kalling's No. 2, using 100 mL HCl and 5 g $CuCl_2$ in 100 mL ethanol solution, followed by immersion or swab etching.

The etching solution for the prior austenite grain boundaries consisted of 54 g picric acid, 135 g of sodium dodecylbenzenesulfonate ($C_{12}H_{25}C_6H_4SO_3Na$), 4.05 g of sodium chloride, 1.90 g of sodium sulfate, with the balance being distilled water to a total solution volume of 2.7 liters. Specimens were then immersed in the solution for approximately 1 minute, or as needed to reveal the grain boundaries. Etching the grain boundaries was particularly difficult in these high purity (e.g. small batch) heats because of the extremely low concentrations of S and P.

Figure 4A:
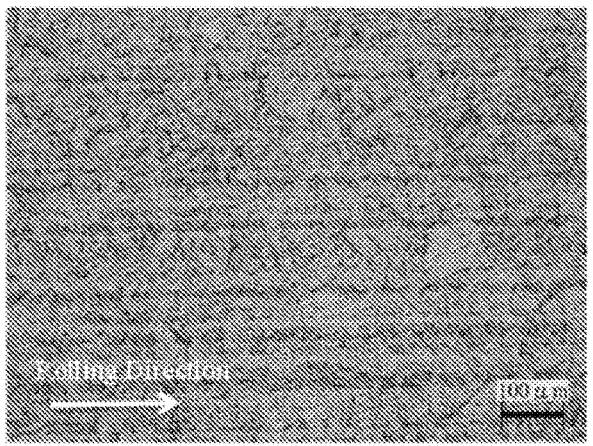
FIGS. 4(a)-4(c) show the normalized-only microstructure at 1050° C. for 5 minutes and 15 minutes.
Figure 4B:
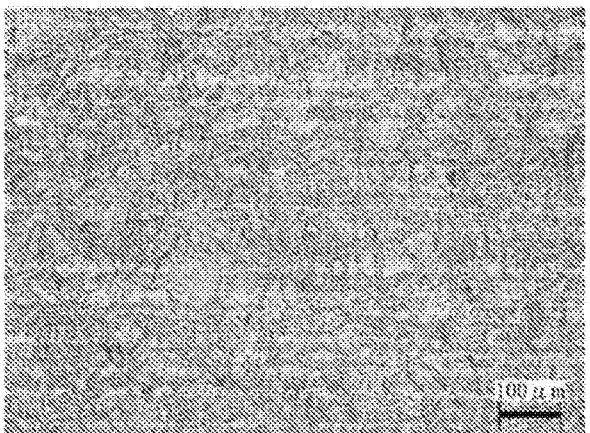
Figure 4C:
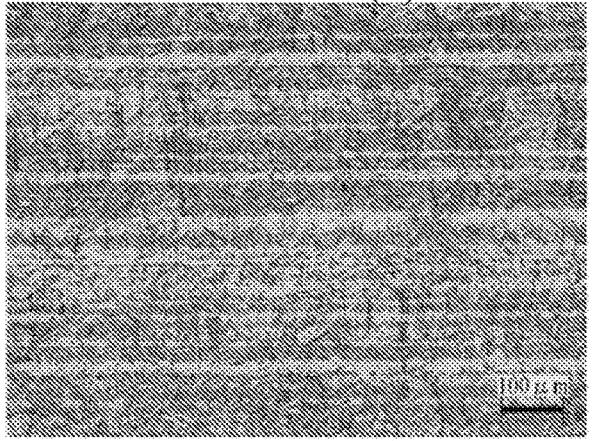

FIGS. 4(a)-4(c) show the normalized-only microstructure at 1050° C. for 5 minutes and 15 minutes. The images are of Heat A and show banded regions stretching left to right and represent a composition gradient (confirmed by electron probe micro-analysis, EPMA), which appears to affect the etching rate. FIG. 4(a) shows heat treatment at 1050° C. for 5 minutes, FIG. 4(b) for 15 minutes, and FIG. 4(c) for 30 minutes. The left-to-right direction in the micrograph corresponds to the rolling direction used when the plates were fabricated. Some regions of the sample etched as expected, while other regions did not. The clearest example of banding is shown for the 1050° C., 30 minute austenitization, shown in FIG. 4(c). In each of these cases, the etching bands indicate that the HT9 sample has not been fully homogenized.

Consistent with these results, it has been noted that an HT9 archive sample from the FFTF MOTA program also shows that homogenization for 5 minutes at 1038° C. was insufficient to result in a fully martensitic structure. FIG. 4(c)

suggests that simply increasing the time at the homogenization temperature to 30 minutes is insufficient to homogenize the HT9.

Figure 5A:
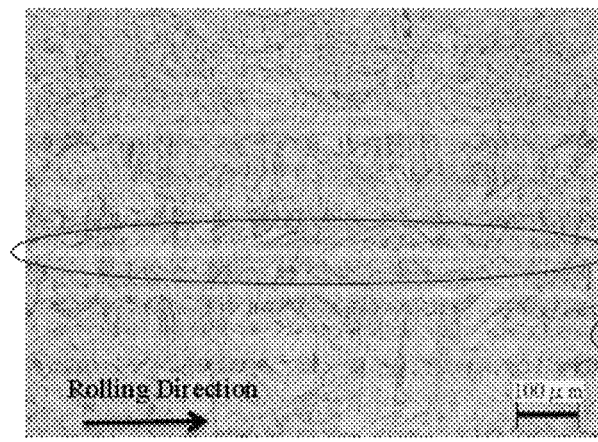
FIGS. 5(a) and 5(b) show that for Heat A even two hours at 1050° C. or 1 hour at 1075° C. does not fully homogenize the microstructure or eliminate the banding.
Figure 5B:
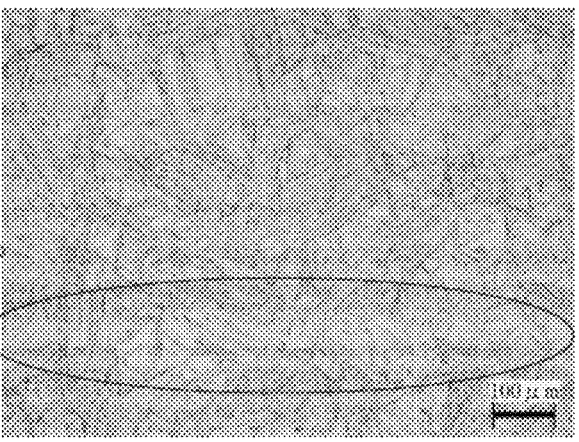

FIGS. 5(a) and 5(b) show that for Heat A even two hours at 1050° C. (FIG. 5 (a)) or 1 hour at 1075° C. (FIG. 5(b)) does not fully homogenize the microstructure or eliminate the banding. The bands of subtle contrast difference in FIGS. 5(a) and 5(b) suggest that inhomogeneity persists.

While FIGS. 4 and 5 are normalized-only microstructures, the banding also reveals itself in the normalized-and-tempered microstructure. The 750° C., 30 minute tempering treatment most clearly shows the banding. It is speculated that the bands are regions of higher Cr concentration that remain after austenitization, and the subsequent tempering treatment causes more chromium-rich $M_{23}C_6$ carbide precipitates to form in these regions.

Figure 6A:
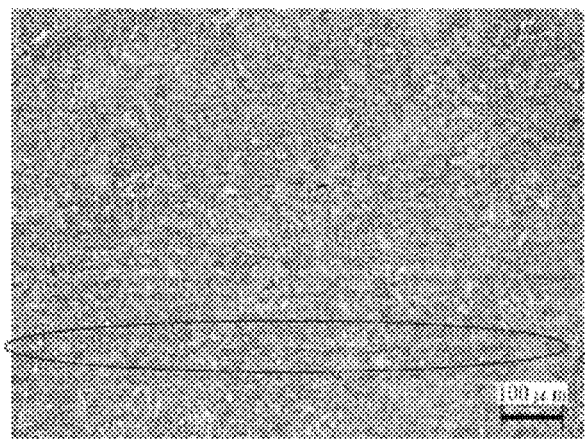
FIGS. 6(a) and 6(b) show several different normalized-and-tempered microstructures in Heat D where the darker bands represent a higher density and/or larger size of carbides.
Figure 6B:
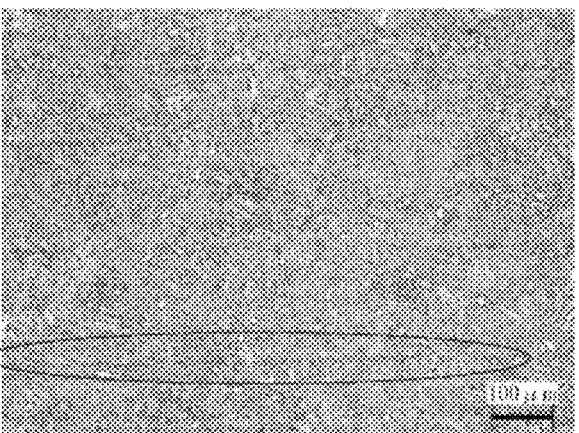

FIGS. 6(a) and 6(b) show several different normalized-and-tempered microstructures in Heat D where the darker bands represent a higher density and/or larger size of carbides. FIG. 6(a) shows an image of HT9 normalized at 1050° C. for 30 minutes, air cooled, and tempered at 750° C. for 30 minutes. FIG. 6(b) shows an image of HT9 normalized at 1075° C. for 15 minutes, air cooled, and tempered at 750° C. for 30 minutes. These bands of higher and lower carbide concentration are likely to have an effect on the mechanical properties and, quite probably, the irradiation performance of the HT9 material.

Figure 7A:
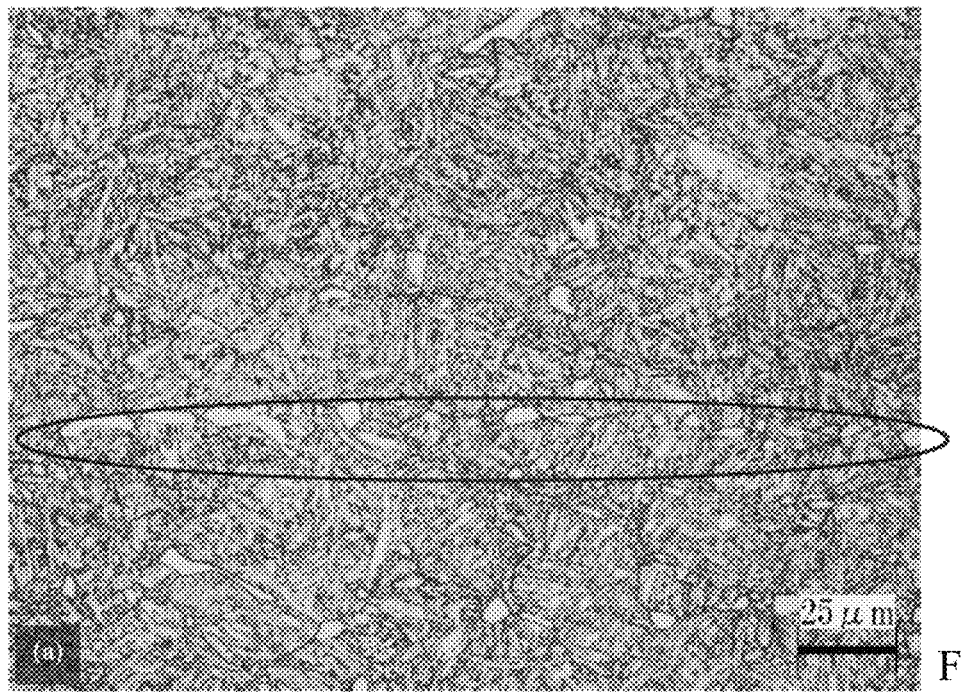
FIGS. 7(a) and 7(b) show several normalized-only micrographs for Heat D HT9.
Figure 7B:
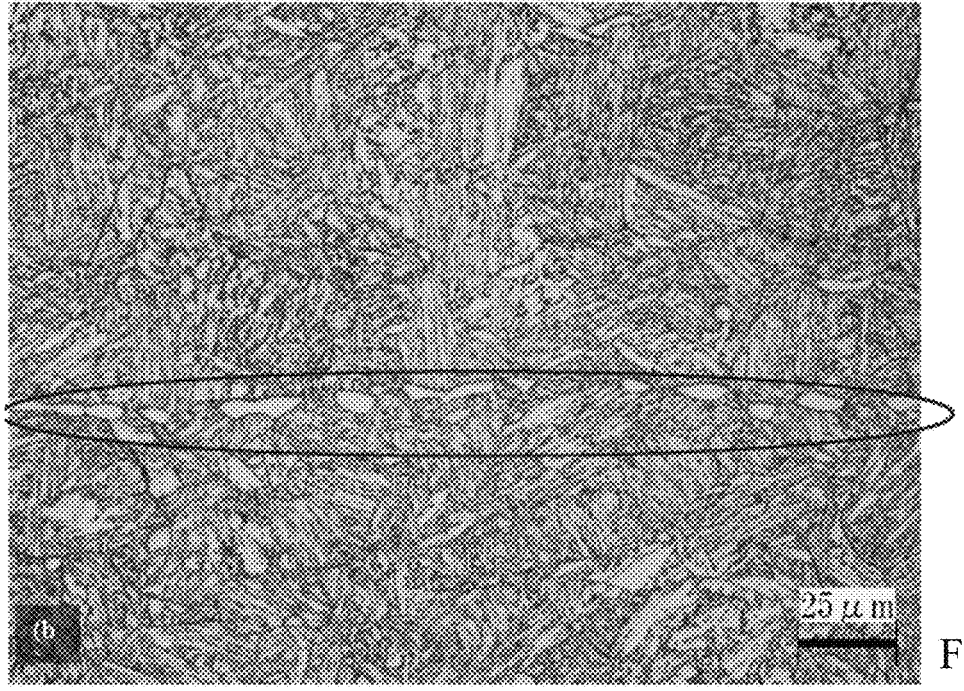

FIGS. 7(a) and 7(b) shows several normalized-only micrographs for Heat D HT9. The δ-ferrite grains are clear, indicated by their blocky or lenticular shape with a dark ring of carbides around their boundary. The tendency for the δ-ferrite grains to align in bands along the working direction indicates that these regions likely had a chromium composition gradient (see Section 5.3) that made δ-ferrite form more easily (chromium is a strong ferrite stabilizer). In essence the Heat D provided additional evidence of the same chromium composition gradient that resulted in banding in the Heat A heat.

Figures 8A, 8B:
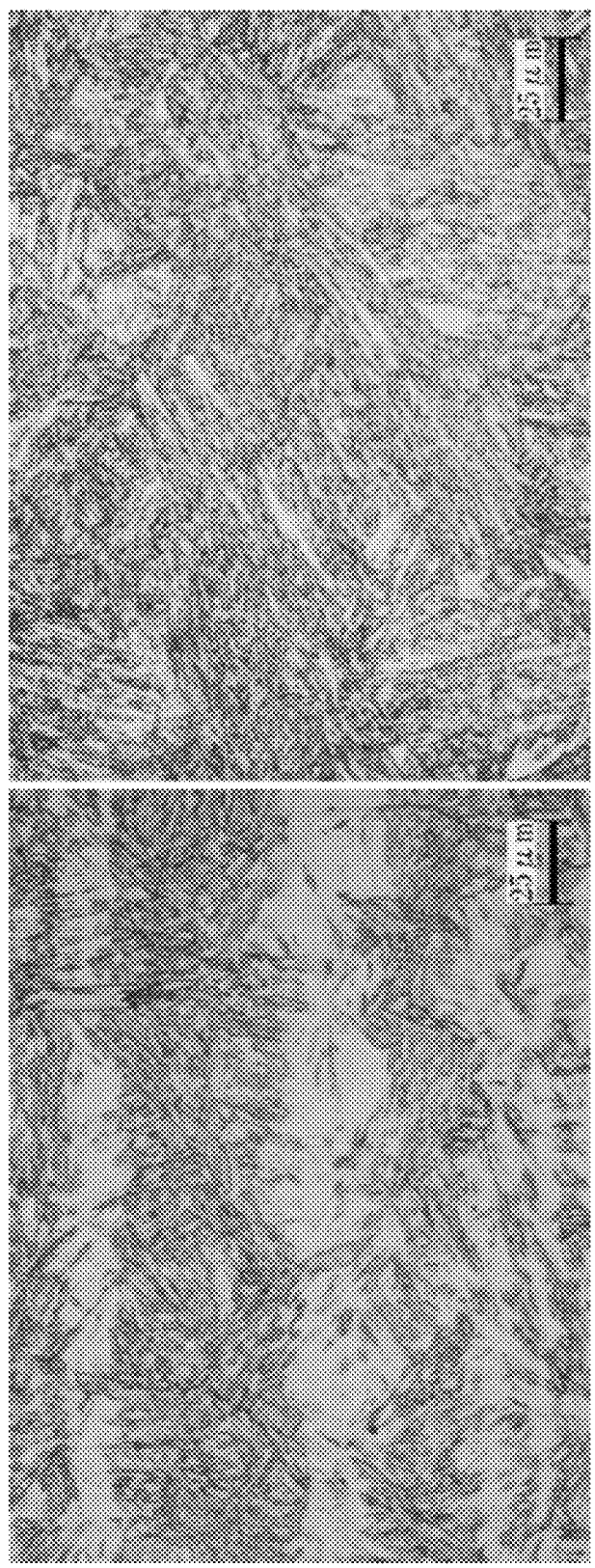
FIGS. 8(a) and 8(b) show a higher magnification comparison between the same heat treatment condition etched on a sample of Heat A with both superpicral and Kalling's No. 2.

FIGS. 8(a) and (b) shows a higher magnification comparison between the same heat treatment condition etched on a sample of Heat A with both superpicral and Kalling's No. 2. Again, this was following austenization at 1050° C. for 30 minutes for a superpicral etch with banded structure (FIG. 8(a)) and Kalling's No. 2 etch with over-etched structure (FIG. 8(b)). The former reveals the martensite lath structure with bands that remain largely un-etched, while the latter shows less contrast in the image, revealing some of the martensitic lath structure but generally showing less detail because of the over-etched condition.

As part of this investigation, an HT9 heat, designated Heat G, was fabricated. Heat G had the following composition: C at 0.20 wt. %; Si at 0.21 wt. %; Mn at 0.64 wt. %; P at 0.004 wt. %; S at 0.002 wt. %; Cr 11.47 wt. %; Mo at 0.89 wt. %; Ni at 0.56 wt. %; V at 0.312 wt. %; W at 0.48 wt. %; Nb<0.004 wt. %; and N at 0.0206 wt. %. During fabrication of tube and plate material from Heat G, portions of the ingot material from which the plates and tubes were fabricated were sectioned and analyzed. For both plate and tube, the ingot was homogenized at 1200° C. for 2 hours, followed by hot forging. In the case of plate material, the ingot was then forged from ingot (200 mm diameter) to 70 mm thickness, homogenized again by hot soaking for 2 hours at 1200° C., then hot rolled to 25 mm thickness and softened at 700° C. for 1 hour. In the case of the tube material, forging was to a round with 35 mm diameter followed by homogenization by soaking at 1100° C. for 1 hour and softened at 700° C. for 1 hour. These homogenization times and temperatures represent typical values currently used by the industry.

The resulting plate and rod material still had measurable Cr segregation as shown in FIGS. 9(a)-(f) for both plate products of Heat G. The results of elemental mapping for the forged and hot rolled product indicated significant Cr segregation even after homogenization at 1200° C. for 2 hours. Without being bound to any particular theory, it is believed that this was due to the homogenization temperature being above the purely austenitic phase temperature range as shown in FIG. 2, causing the formation of δ-ferrite phase during the homogenization operation.

Figure 20:
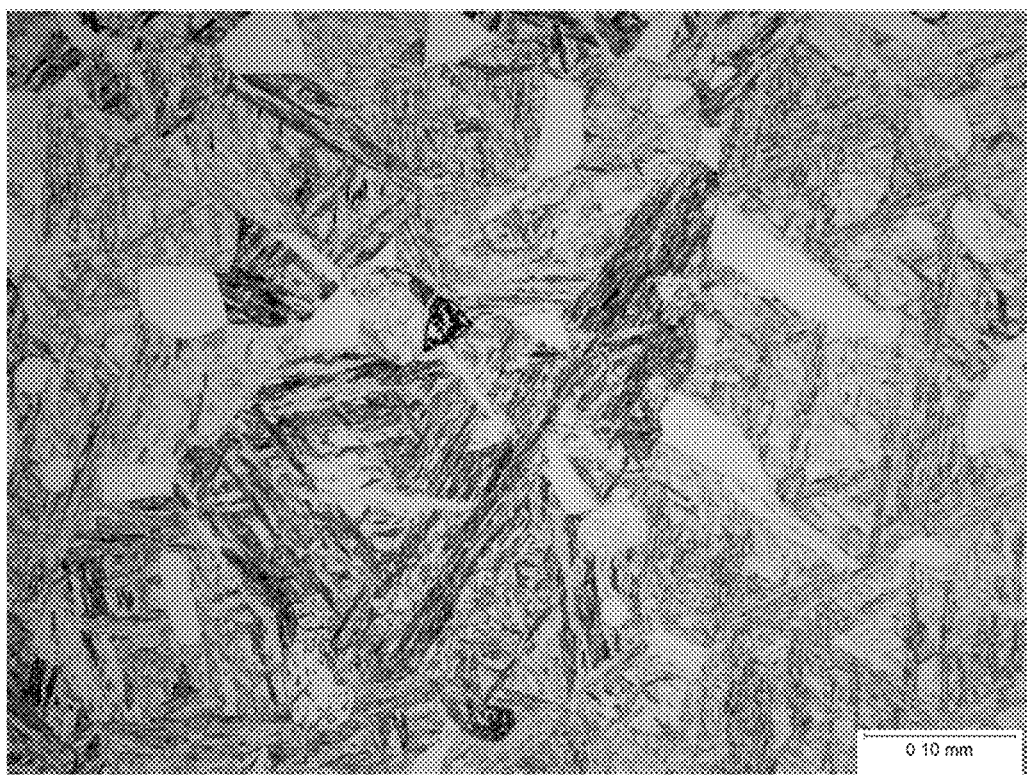
FIG. 20 is an image of a heat of HT9 homogenized at a temperature above the purely austenitic phase showing the resulting formation of unwanted δ-ferrite.

FIG. 20 provides evidence for this conclusion. FIG. 20 shows HT9 steel after vacuum induction melting, vacuum arc re-melting, and homogenization at 1200° C. for 48 hours. The image shows the longitudinal orientation of the sample at 200× magnification. The dual phase of ferrite (δ-ferrite) and martensite can be seen indicating that simply holding the homogenization time period for a long time is insufficient to prevent formation of δ-ferrite without also controlling the temperature. In this case, the dual phase microstructure is evidence that 1200° C. was not a single-phase temperature range for this particular heat of HT9.

Figure 9A:
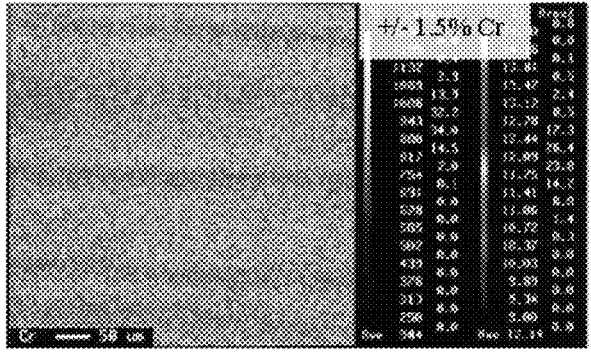
FIGS. 9(a)-9(f) illustrate that the resulting plate and rod material still had measurable Cr segregation for both plate and tube product of Heat G.

Based on an inspection of the FIGS. 9(a) and (b), the Cr banding was identified as the inhomogenous distributed component and the characteristic distance, in this case average distance between bands, was determined to be 100 μm. From that information, the d/B ratio for Cr in the two examples was determined to be d/B=0.2 for homogenization at 1100° C. for 1 hour and 0.5 for homogenization at 1200° C. for 2 hours. This result clearly indicates that the Cr did not have enough time to diffuse throughout the steel element during homogenization, hence the observed banding.

To determine the solution for eliminating the Cr segregation the hot-rolled plate and forged bar were homogenized a second time at 1180° C. for 20 and for 48 hours, in order to observe the effect of increased d/B ratio on Cr segregation. Results from EPMA/WDS mapping after this heat treatment are shown in FIGS. 9(c)-(f).

Figure 9B:
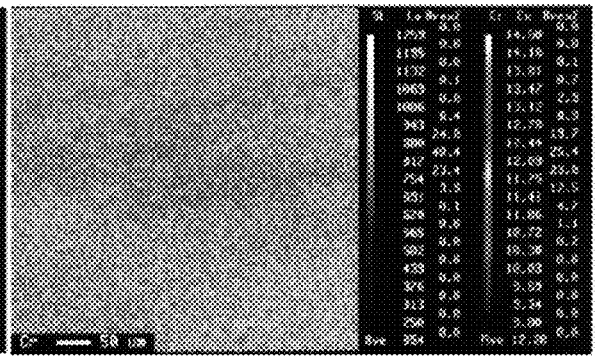
Figure 9C:
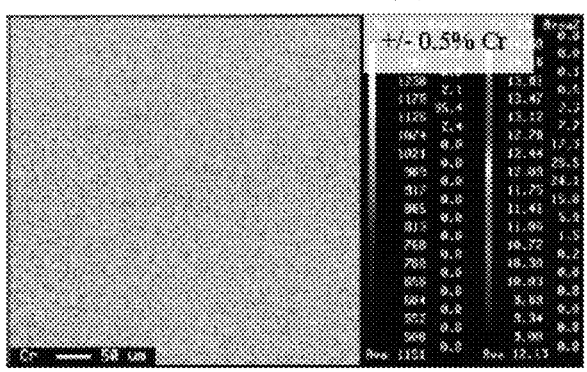
Figure 9D:
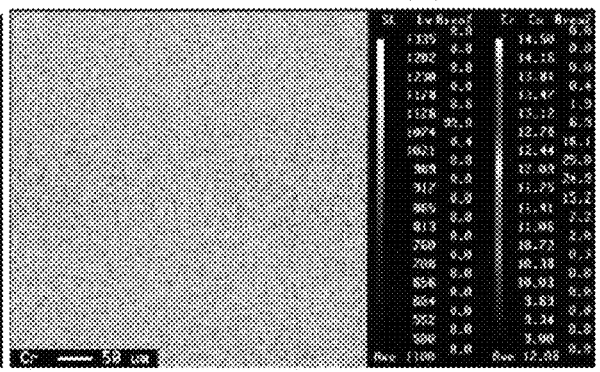
Figure 9E:
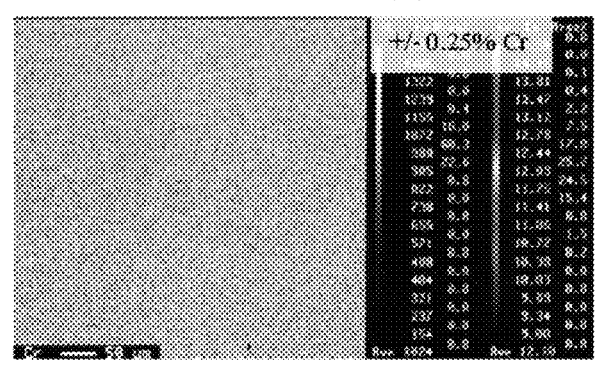
Figure 9F:
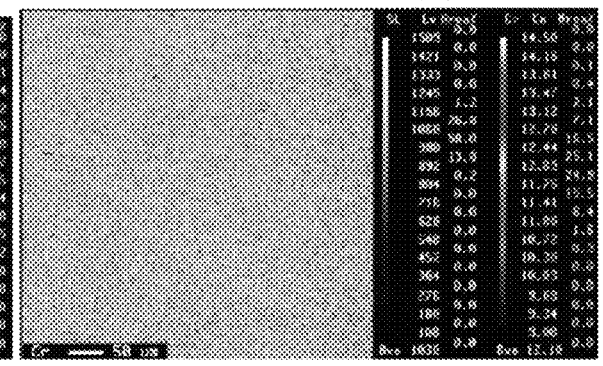

FIGS. 9(a)-(f) illustrate the EPMA/WDS mapping for Cr content in Heat G plate hot-rolled to 25 mm thickness, or rod (also referred to as bar) forged to 35 mm diameter. FIG. 9(a) is of plate normalized at 700° C. for 1 hour. FIG. 9(b) is rod normalized at 1100° C. for 1 hour and tempered at 700° C. for 1 hour. FIG. 9(c) is of plate normalized at 1180° C. for 20 hours. FIG. 9(d) is rod normalized at 1180° C. for 20 hours. FIG. 9(e) is plate normalized at 1180° C. for 48 hours. FIG. 9(f) is rod normalized at 1180° C. for 48 hours.

While the segregation is mostly eliminated after 20 hours (FIGS. 9(c) and (d)) corresponding to a d/B=1.5, some of the banding is still observed. Homogenization at 1180° C. for 48 hours was considered even more effective (FIGS. 9(e) and (f)), which corresponded to a d/B ratio of 2.2.

The calculations of the d/B ratios for these examples are provided below in Table 2. These calculations were made for diffusion of Cr in the steel composition of the examples within the austenitic phase setting the characteristic distance B to 100 μm.

TABLE 2

| For Cr diffusion in homogeneous gamma-Fe | |
| --- | --- |
| Diffusion distance, d = | SQRT(D * exp[−Q/(kT)] * t) |
| D = | 0.64 cm²/s |
| Q = | 231,900 J/mol |

TABLE 2-continued

| For Cr diffusion in homogeneous gamma-Fe | | | | |
|---|---|---|---|---|
| k = | 1.38E−23 J/K | | | |
| at/mol | 6.02E+23 at/mol | | | |
| Homogenization Temp (C.) | 1100 | 1200 | 1180 | 1180 |
| time (hours) | 1 | 2 | 20 | 48 |
| time (s) | 3600 | 7200 | 72000 | 172800 |
| d (cm) = | 1.85E−03 | 5.22E−03 | 1.45E−02 | 2.25E−02 |
| d (μm) = | 19 | 52 | 145 | 225 |
| d/B = | 0.2 | 0.5 | 1.5 | 2.2 |

From these calculations, it can be seen empirically that selecting a d/B for ratio for a component of equal to or greater than 1.5 leads to a greater homogeneity of the steel composition prior to working and heat treatment, and thus to a better quality product than that observed at the typical homogenization time and temperatures. The analysis further shows that additional improvement can be had by increasing the d/B to equal to or greater than 2.0, such as 2.2, as evidenced by the apparent elimination of banding in the homogenization at 1180° C. for 48 hours.

The examples do not identify the optimum d/B ratio as that will also be determined by the additional cost for the more thorough homogenization treatment. However, the examples do verify that d/B≤0.5 results in a relatively poorer steel element and d/B>0.5 gives an improved result. Furthermore, a d/B≥1.0, 1.5, 2.0 and, even, 2.2 give progressively better results. Given the apparent elimination of banding in the homogenization at 1180° C. for 48 hours, a d/B>2.2 may not provide any additional improvement in the performance of the steel element as the element may be fully homogenized at this point.

Swelling Performance of Steels Produced Using the Method

Embodiments of the method described above were used to manufacture several heats of HT9 steel in order to investigate the improvement in void swelling performance against a known historical sample. Three heats of HT9 steel, identified as Heats FD (which is the same steel sample as Heat D above, only renamed for clarity), CH, and DH, were prepared. Heats CH and DH are the same steel composition and differ only in a slight variation in the final heat treatment. For relative comparison between historic HT9 and the embodiments of the composition described herein, a historical HT9 sample of heat 84425 from the ACO-3 duct used in the Fast Flux Test Facility (FFTF) was tested for swelling using the same protocol.

The actual composition of the final plate product of each heat was determined by analysis and is shown in Table 3. The actual composition of the historical sample was also determined and is likewise presented in Table 3.

TABLE 3

| | Heat FD | | | Heats CH and DH | Historical HT9 ACO-3 |
|---|---|---|---|---|---|
| Element | Max. | Min. | Actual | Actual | Actual |
| Fe | Bal. | Bal. | Bal. | Bal. | Bal. |
| C | 0.19 | 0.17 | 0.176 | 0.20 | 0.20 |
| Si | 0.23 | 0.17 | 0.21 | 0.22 | 0.27 |
| Mn | 0.53 | 0.47 | 0.50 | 0.69 | 0.58 |
| P | 0.01 | — | <0.005 | 0.004 | 0.003 |
| S | 0.003 | — | 0.0017 | 0.001 | 0.004 |
| Cr | 12.2 | 11.8 | 12.12 | 11.56 | 11.87 |
| Mo | 1.05 | 0.95 | 1.01 | 0.88 | 1.02 |
| Ni | 0.55 | 0.45 | 0.52 | 0.56 | 0.53 |
| V | 0.33 | 0.27 | 0.30 | 0.315 | 0.30 |
| W | 0.65 | 0.55 | 0.60 | 0.49 | 0.37 |
| N | 0.013 | 0.007 | 0.011 | 0.023 | 0.0017 |
| Cu | 0.02 | — | <0.01 | — | 0.013 |
| Al | — | — | — | — | 0.002 |
| Nb | — | — | — | <0.004 | <0.010 |
| Co | — | — | — | — | 0.011 |

Sample Preparation

Heat FD is the same steel heat designated Heat D in the previous discussion and its preparation was described above. Information regarding the preparation of the ACO-3 sample can be found in Irradiation Dose And Temperature Dependence Of Fracture Toughness In High Dose HT9 Steel From The Fuel Duct Of FFTF, by Thak Sang Byun, et al., Journal of Nuclear Materials 432 (2013) pp. 1-8.

Figure 10A:
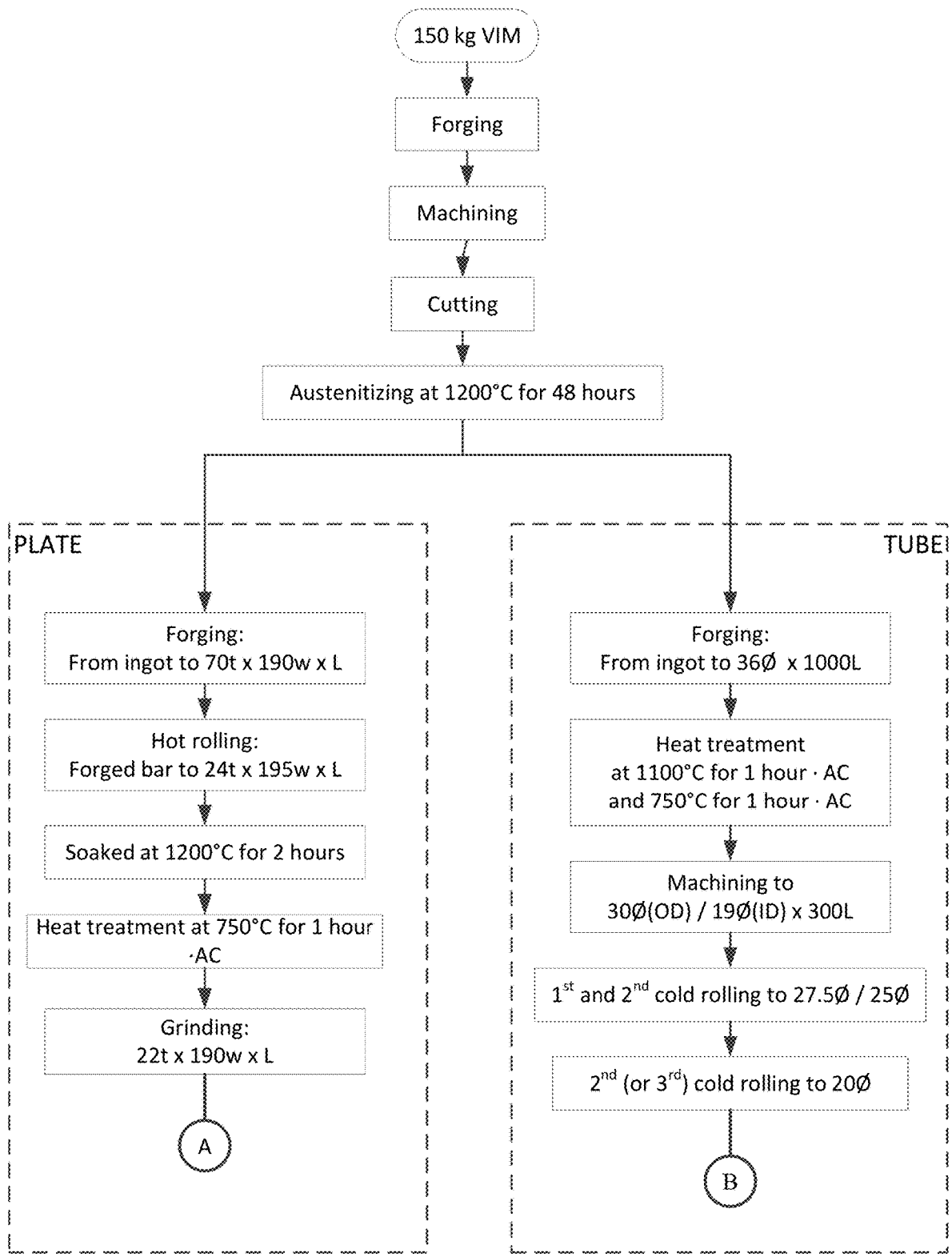
FIGS. 10(a) and 10(b) show a process outline of the major process steps used to fabricate plate and tube products of Heats CH and DH.
Figure 10B:
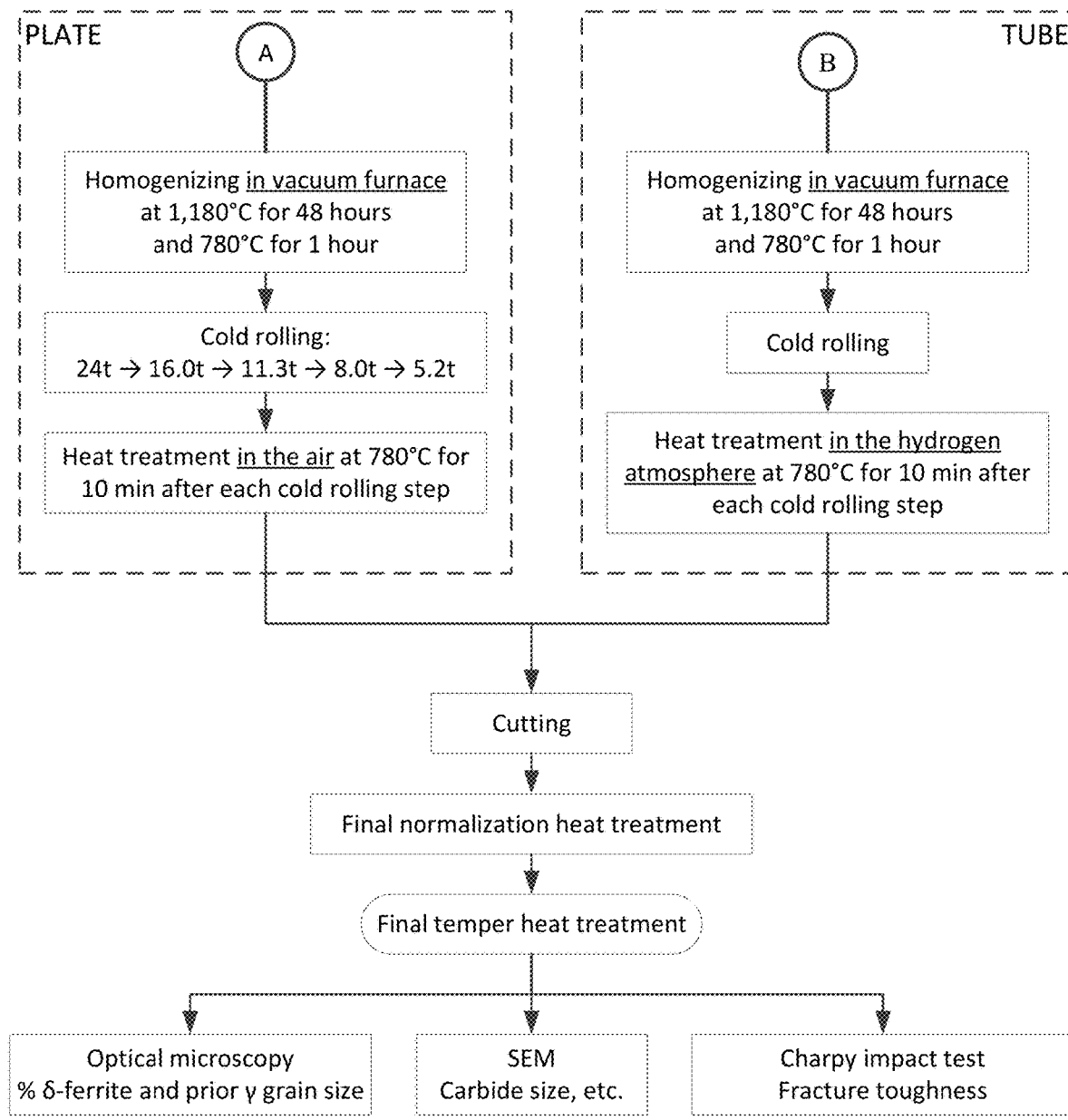

FIGS. 10(a) and 10(b) show a process outline of the major process steps used to fabricate plate and tube products of Heats CH and DH. The early processing steps (vacuum induction melting (VIM), vacuum arc re-melting (VAR) and homogenization were applied for both Heats. During the fabrication of the Heats CH and DH, the dB=2.2 was used to determine the homogenization treatment at 1180° C. for 48 hours, which was performed either after hot rolling of the plate or after the $2^{nd}$ or $3^{rd}$ cold rolling step for the tube.

Heavy ion irradiation testing was conducted on plates of each of the three heats and the historic control sample to determine the swelling performance of the composition. Irradiations were conducted in an ion beam laboratory using a dual ion ($Fe^{++}$ and $He^{++}$) irradiation beam to simulate the production of He from (n,α) reactions and the subsequent formation of voids in a neutron environment. Energetic 5 MeV $Fe^{++}$ and low current $He^{++}$ ions were directed at the steel samples at temperatures of 440, 460, and 480° C. to an irradiation dose level of 188 dpa. ~2 MeV $He^{++}$ ions are transmitted through an Al foil with a thickness of ~3 μm in order to degrade their energy and deposit the $He^{+}$ at the appropriate depth in the steel. The precise $He^{++}$ beam energy is dependent on the exact thickness of the Al foil. The Al foil is rotated relative to the $He^{++}$ beam in order change the incidence angle of the beam and modify the depth of implantation in the steel to range from 300-1000 nm. The incidence angle varies from 0-60° at five different intervals, with different hold times for each incidence angle, producing five separate depth profiles that cumulatively provide a roughly uniform (±10%) He concentration from 300-1000 nm into the steel.

The irradiations were conducted on the three heats and the historical control sample using a 3 MV Pelletron accelerator. Samples were irradiated using a combination of a defocused 5 MeV $Fe^{++}$ ion beam with typical beam current of ~100-400 nA on the samples and a 3 mm diameter focused ~2 MeV $He^{++}$ beam that was raster scanned at 0.255 kHz in x and 1.055 kHz in y. Before each irradiation, the stage was outgassed to a pressure below $1 \times 10^{-7}$ torr. The beam current was recorded every 30-60 minutes using the Faraday cup immediately in front of the samples and the integrated charge (current×time) was converted to dose based on the damage rate output of Stopping Range of Ions in Matter (SRIM) calculation at a depth of 600 nm using the Quick Kinchin-Pease mode and a 40 eV displacement energy.

The samples were mechanically polished using SiC paper up to a fine grit of #4000 followed by final polishing with diamond solutions up to 0.25 μm, with a final mechanical polishing of 0.02 colloidal silica solution prior to irradiation. After mechanical polishing, specimens were electropolished for 20 seconds in a 90% methanol and 10% perchloric acid solution, at temperatures between −40° C. and −50° C., with an applied potential of 35 V between the specimen and platinum mesh cathode.

Temperature control was achieved by using a series of thermocouples affixed to irradiation samples that are heated and then used to calibrate a two-dimensional imaging pyrometer at the irradiation temperature. Temperature was controlled using the imaging pyrometer to ±10° C. throughout the irradiation.

Irradiated sample preparation was accomplished using cross-section focused ion beam (FIB) liftouts from the irradiated surface of each sample. The liftout method allows the entire irradiation damage region to be imaged, and for void imaging analysis to be consistently performed only at the desired depth.

Figure 11:
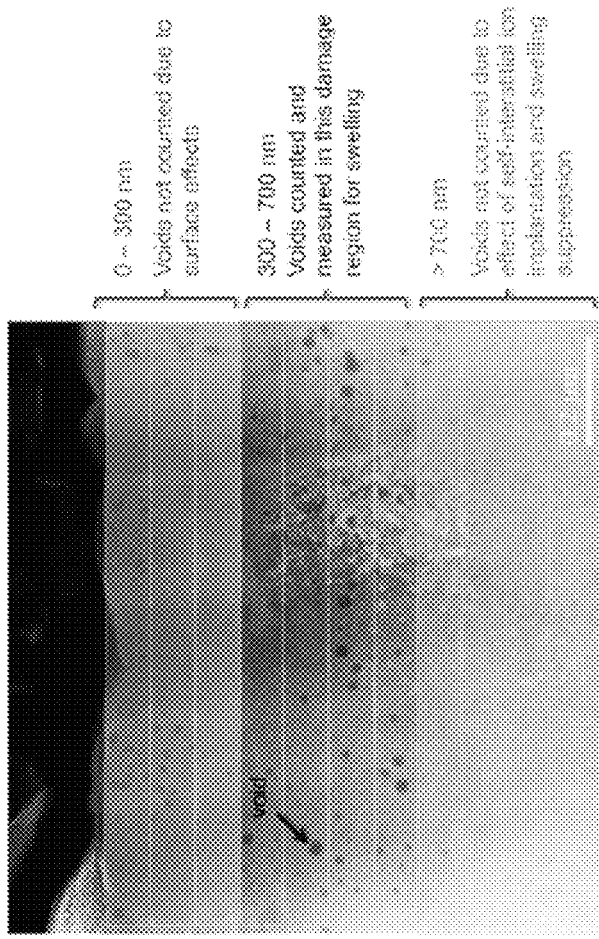
FIG. 11 illustrates a representative transmission electron microscope (TEM) image illustrating the depth effect on voids created by irradiation.

FIG. 11 illustrates a representative transmission electron microscope (TEM) image illustrating the depth effect on voids created by irradiation. Void imaging was done on a JEOL 2100F TEM. Void measurements included only voids that were within a damage zone depth of 300-700 nm into the sample, as represented by FIG. 11. By performing the analysis in this way, all voids at the surface (0-300 nm), which would be influenced by surface effects and changes in surface composition, were not taken into account. So, too, all voids at the end of damage curve (>700 nm) that may be affected by self-interstitial implantation of the $Fe^{++}$ ion were not considered. Self-interstitial ions at the end of the damage curve tend to suppress void nucleation by affecting the vacancy/interstitial bias that causes void nucleation.

Sample thickness was measured using electron energy loss spectroscopy (EELS) to measure the zero energy loss fraction and determine sample thickness. Using sample thickness and image area, void density and swelling measurements can be made.

As mentioned above, the irradiations included a sample from the archived ACO-3 duct HT9 material from FFTF for a relative swelling comparison to the composition embodiments described above. Heavy ion irradiations were conducted on the four heats (CH, DH, FD, and ACO-3) described above in order to generate a relative comparison in swelling behavior among the different heats. The swelling response could also be compared to the archive (heat 84425) of HT9 from ACO-3 duct wall from the FFTF program, irradiated at 443° C. to a dose of 155 dpa, which demonstrated swelling of ~0.3% based on TEM imaging of the voids.

Figure 12:
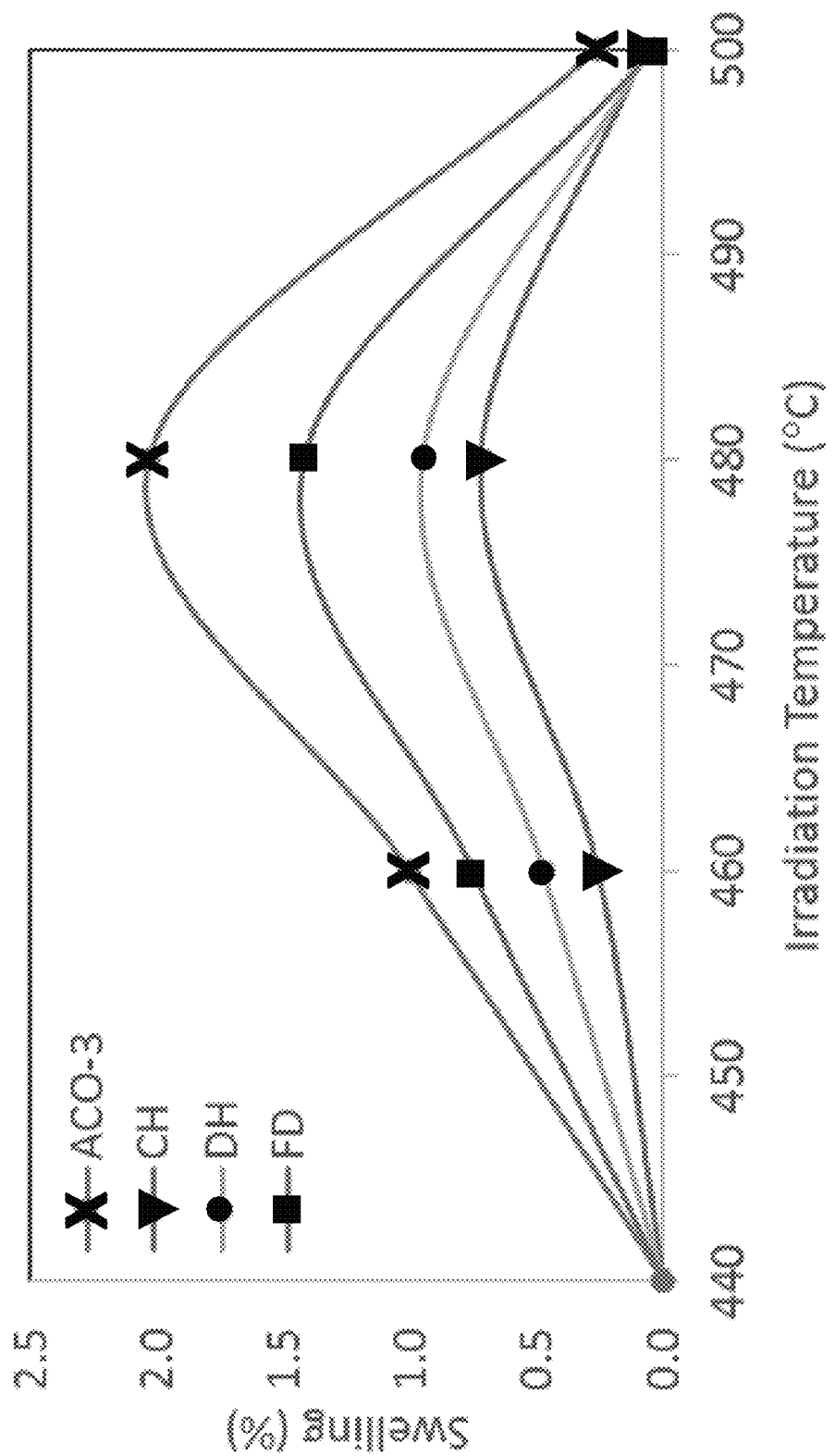
FIG. 12 shows the swelling results for the heats.

To quantify the difference in swelling performance between the embodiments of the present compositions and the historic ACO-3 steel, the swelling % data in FIG. 12 were determined using process identified in Section 2.2 of the article Void Swelling And Microstructure Evolution At Very High Damage Level In Self-Ion Irradiated Ferritic-Martensitic Steels, by E. Getto, et al., Journal of Nuclear Materials 480 (2016) pp. 159-176, which section is incorporated herein by reference. Wherever swelling % is used in this disclosure, it is calculated by the process identified in the incorporated Section.

FIG. 12 shows the swelling results for the heats. FIG. 12 clearly shows the difference in void swelling performance of the composition embodiments relative to the archived ACO-3. At the lower and higher temperatures, 440° C. and 500° C., little swelling was detectable in any of the heats. However, at temperatures of 460° C. and 480° C., each of the three heats of the present composition show significant improvements in swelling over the historic ACO-3 steel.

Figure 13:
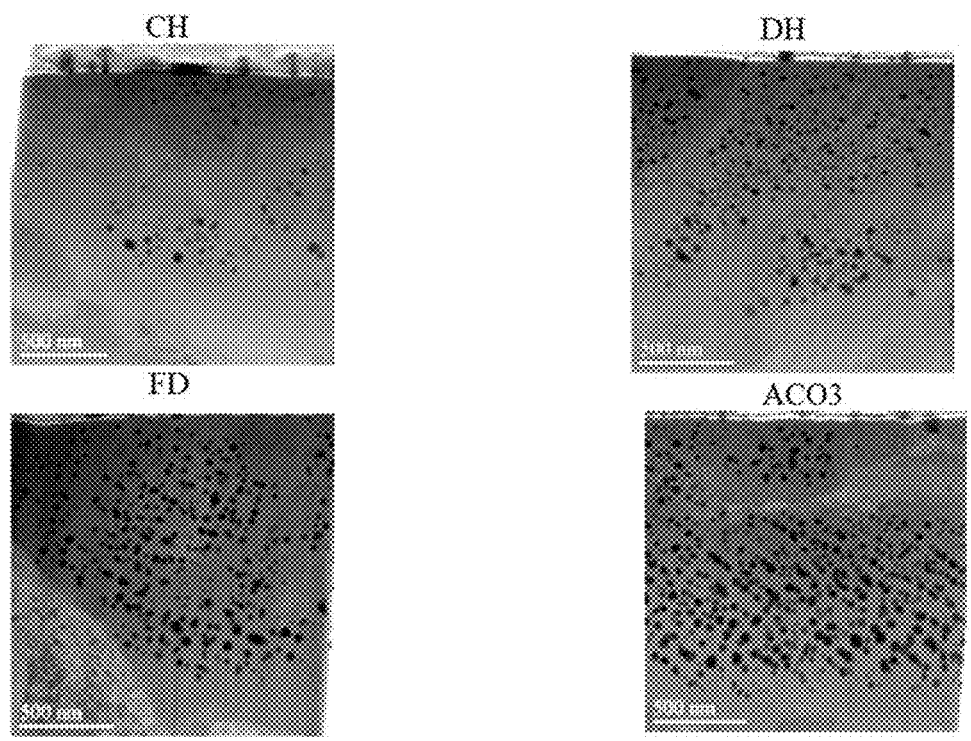
FIG. 13 shows a TEM collage of void microstructure in the four heats after irradiation at 480° C. to 188 dpa with 0.2 appm He/dpa, in which the voids appear as the black features.

FIG. 13 shows a TEM collage of void microstructure in the four heats after irradiation at 480° C. to 188 dpa with 0.2 appm He/dpa, in which the voids appear as the black features. The ACO-3 sample showed an inhomogeneous distribution of voids, but with a large cluster of many voids. The heats of the present composition each show a clear improvement over the ACO-3. The differences between ACO-3 and the heats of the present composition are striking and reflect a difference in void incubation between ACO-3 and the embodiments of the steel compositions described herein.

Figure 14:
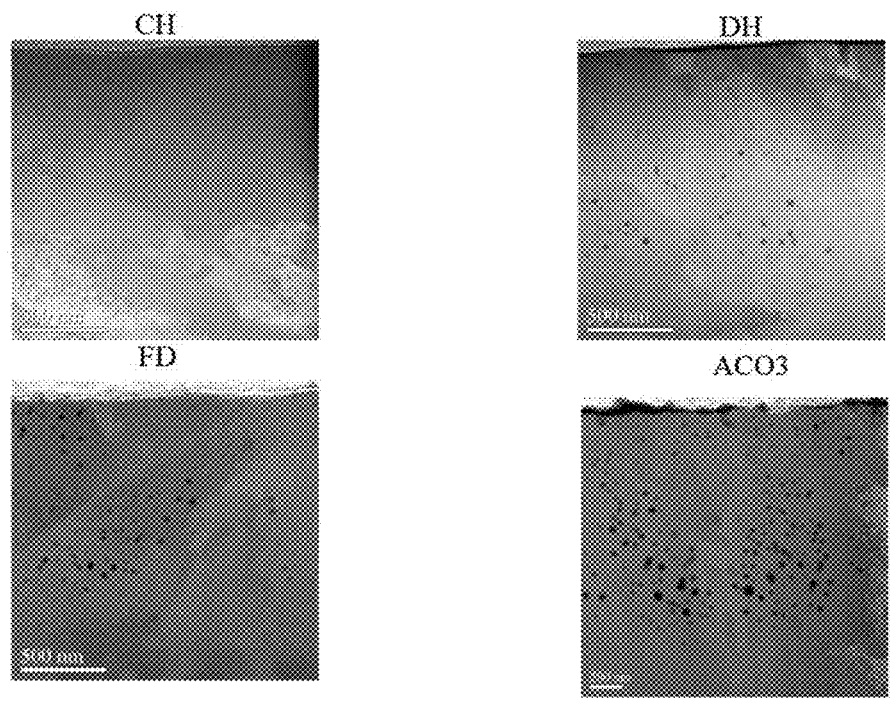
FIG. 14 shows a TEM collage of void microstructure in the four heats after irradiation at 460° C. to 188 dpa with 0.015 appm He/dpa.

FIG. 14 shows a TEM collage of void microstructure in the four heats after irradiation at 460° C. to 188 dpa with 0.015 appm He/dpa. Again, the heats of the present composition each show a clear improvement over the ACO-3.

In some places, concentrations, amounts, and other numerical data have been expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "4 percent to 7 percent" should be interpreted to include not only the explicitly recited values of 4 percent to 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Ranges when specified in the format 9.0-12.0 are inclusive of the limits of the range (i.e., 9.0-12.0 includes compositions having 9.0 and compositions having 12.0). Furthermore, such an interpretation should apply regardless of the breadth of the range or the characteristics being described.

Notwithstanding that the numerical ranges and parameters setting forth the broad scope of the technology are approximations, the numerical values set forth in the specific examples are reported as precisely as possible. Any numerical value, however, inherently contains certain errors necessarily resulting from the standard deviation found in their respective testing measurements.

INDUSTRIAL USES

Well homogenized steels made using the methods described herein are suitable for any uses in which high performance is beneficial. In addition, uses where swelling resistance, creep strength and fracture toughness are beneficial would also be suitable for the steels described herein. In particular, steel made using the embodiments described above may have improved performance for any use in which the steel is exposed to nuclear radiation. For example, reactor core components, containment vessels, piping, and structure supports are examples of high-temperature uses of the steels described herein.

One particular use of the steel made using the embodiments described herein is as cladding material for nuclear fuel. Fuel cladding refers to the outer layer of fuel elements (sometimes also called "fuel rods" or "fuel pins"). Cladding prevents fission products from escaping from the fuel into the reactor. Steels developed for nuclear fuel cladding are exposed to high neutron fluxes and high temperatures and therefore have several common requirements: good swelling resistance, high irradiation plus thermal creep strength, and excellent phase stability. Void swelling is the tendency for vacancy defects to accumulate into nanometer-scale cavities that can result in bulk dimensional changes (swelling) to a component. These changes can become significant enough to impair component functionality. Irradiation creep, meanwhile, is similar to thermal creep in that the applied stress is the driving force for the defect flux. However, the source of defects is produced by irradiation and does not directly depend on temperature, and irradiation creep is generally accepted to be linearly dependent with stress. The effect of irradiation creep is the same as thermal creep, however, with creep deformation resulting in dimensional changes.

An example of the need to withstand high neutron fluxes is illustrated by the behavior of austenitic stainless steels, such as the common grades of 304 and 316. While these steels have long seen application in reactor environments, the solution-annealed condition was quickly recognized as deficient for most reactor applications, as void swelling rates can be as high as 1% per displacement per atom even after short irradiation times resulting in only a few displacements per atom (dpa). Irradiation dose in a material is measured in dpa, which is a measure of the number of times every atom in a material has been knocked off its lattice site. While many improvements have been made to the austenitic stainless steels to improve swelling resistance, for high dose applications, they are unable to maintain dimensional stability and meet performance requirements for fuel cladding at very high doses. Since most atoms quickly return to their lattice site without lasting damage, an atom can be displaced multiple times on average before bulk properties are significantly degraded. A modified austenitic stainless steel such as D9 (316+Ti and other solute additions, always fabricated in the 20% cold worked condition) can even withstand about 100 dpa of irradiation damage before bulk swelling is severely limiting.

Many modern reactor designs, however, would benefit from fuel cladding having improved performance over those made of modified austenitic stainless steels. In an embodiment, reactor core components, and specifically fuel cladding, which can withstand peak irradiation doses on the order of 200, 300, 400, or 500 dpa or more would be beneficial. At the moment, there are currently no such steels available and, thus, reactor design is limited in order to account for the lower performance of the currently available steels. For example, embodiments of the steels described herein may have sufficient creep resistance at nominal reactor outlet temperatures of 550° C. or even higher for the steel to remain in service for fuel lifetimes up to 40 years or longer. Likewise, embodiments may have similarly improved swelling resistance, exhibiting a volumetric swelling of 5% or less for fuel lifetimes up to 40 years or longer, and sufficient fracture toughness to resist fracture or failure after irradiation at temperatures of up to 360° C.

Figure 15A:
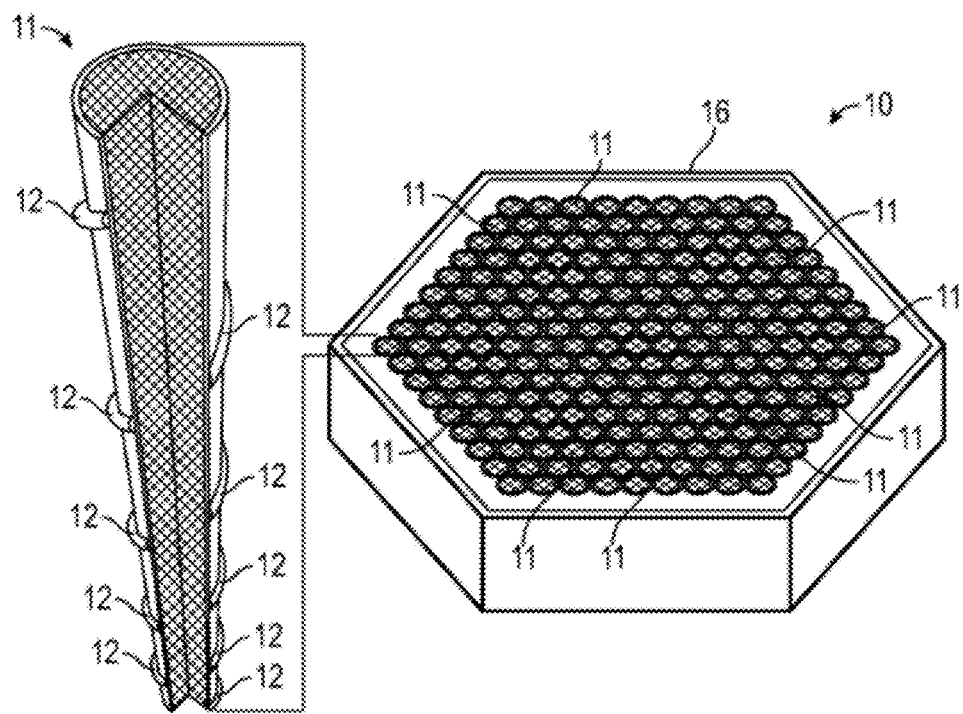
FIGS. 15(a)-15(c) provide partial-cutaway perspective views in schematic form of an embodiment of a nuclear fuel assembly comprised of multiple fuel elements.

FIG. 15(a) provides partial-cutaway perspective views in schematic form of an embodiment of a nuclear fuel assembly comprised of multiple fuel elements. FIG. 15(a) provides a partial illustration of a nuclear fuel assembly 10 in accordance with one embodiment. The fuel assembly may be a fissile nuclear fuel assembly or a fertile nuclear fuel assembly. The assembly may include fuel elements (or "fuel rods" or "fuel pins") 11 in a frame or housing 16. To allow for circulation around the exterior of the fuel element 11, a spiral rib 12 may be provided to ensure some standoff space and circulation path around the outside of the element 11.

Figure 15B:
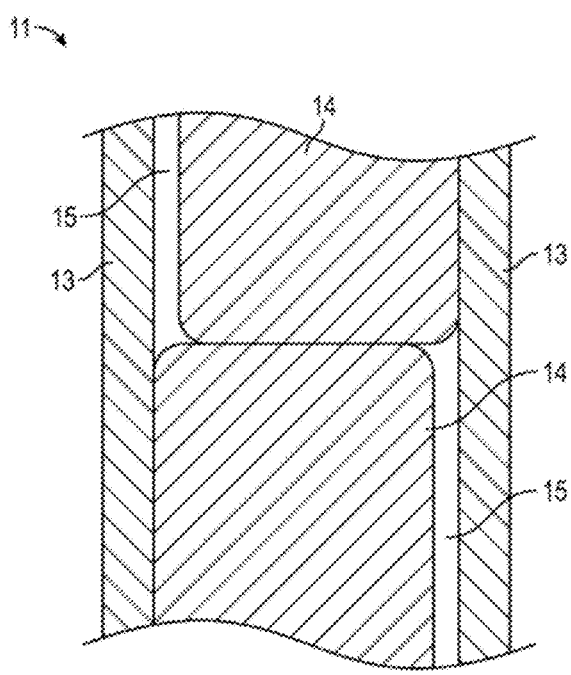

FIG. 15(b) provides a partial illustration of a fuel element 11 in accordance with one embodiment. As shown in this embodiment, the fuel element 11 may include a cladding material 13, a fuel 14, and, in some instances, at least one gap 15.

A fuel may be sealed within a cavity by the exterior cladding material 13. In some instances, the multiple fuel materials may be stacked axially as shown in FIG. 15(b), but this need not be the case. For example, a fuel element may contain only one fuel material. In one embodiment, gap(s) 15 may be present between the fuel material and the cladding material, though gap(s) need not be present. In one embodiment, the gap is filled with a pressurized atmosphere, such as a pressured helium atmosphere. In an additional embodiment, the gap may be filled with sodium.

A fuel may contain any fissionable material. A fissionable material may contain a metal and/or metal alloy. In one embodiment, the fuel may be a metal fuel. It can be appreciated that metal fuel may offer relatively high heavy metal loadings and excellent neutron economy, which is desirable for breed-and-burn process of a nuclear fission reactor. Depending on the application, fuel may include at least one element chosen from U, Th, Am, Np, and Pu. The term "element" as represented by a chemical symbol herein may refer to one that is found in the Periodic Table—this is not to be confused with the "element" of a "fuel element".

Figure 15C:
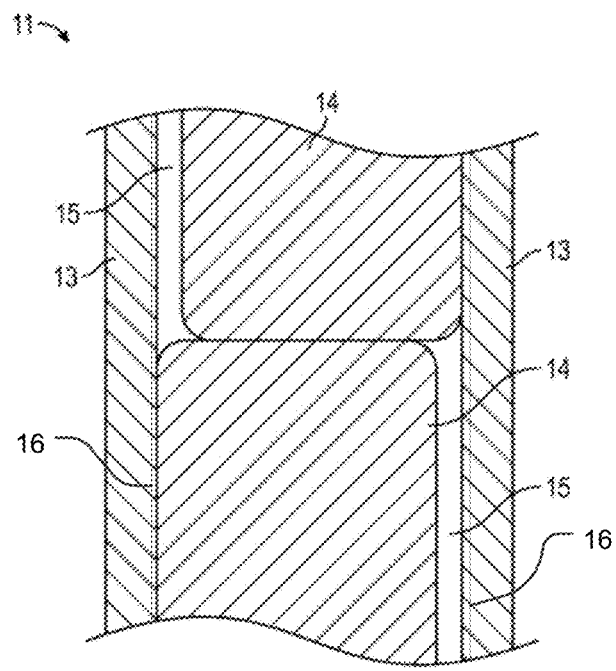

FIG. 15(c) illustrates an embodiment of a fuel element in which one or more liners are provided between the cladding and the fuel. In some cases, particularly at high burn-ups, the elements of the fuel and the cladding may tend to diffuse, thereby causing un-desirable alloying and thus degrading the material of the fuel and the cladding (e.g., by de-alloying of the fuel and/or cladding layer or forming a new alloy with degraded mechanical properties). A liner 16 as illustrated may serve as a barrier layer between the fuel 14 and the cladding 13 to mitigate such interatomic diffusion of the elements. For example, a liner 16 may be employed to mitigate interatomic diffusion between the elements of the fuel and the cladding material to avoid, for example, degradation of the fuel and/or cladding material by foreign (and sometimes undesirable) elements. The liner 16 may contain one layer or multiple layers—e.g., at least 2, 3, 4, 5, 6, or more layers. In the case where the liner contains multiple layers, these layers may contain the same or different materials and/or have the same or different properties. For example, in one embodiment, at least some of the layers may include the same steel as the cladding while some layers of the liner 16 include different materials.

Figure 16:
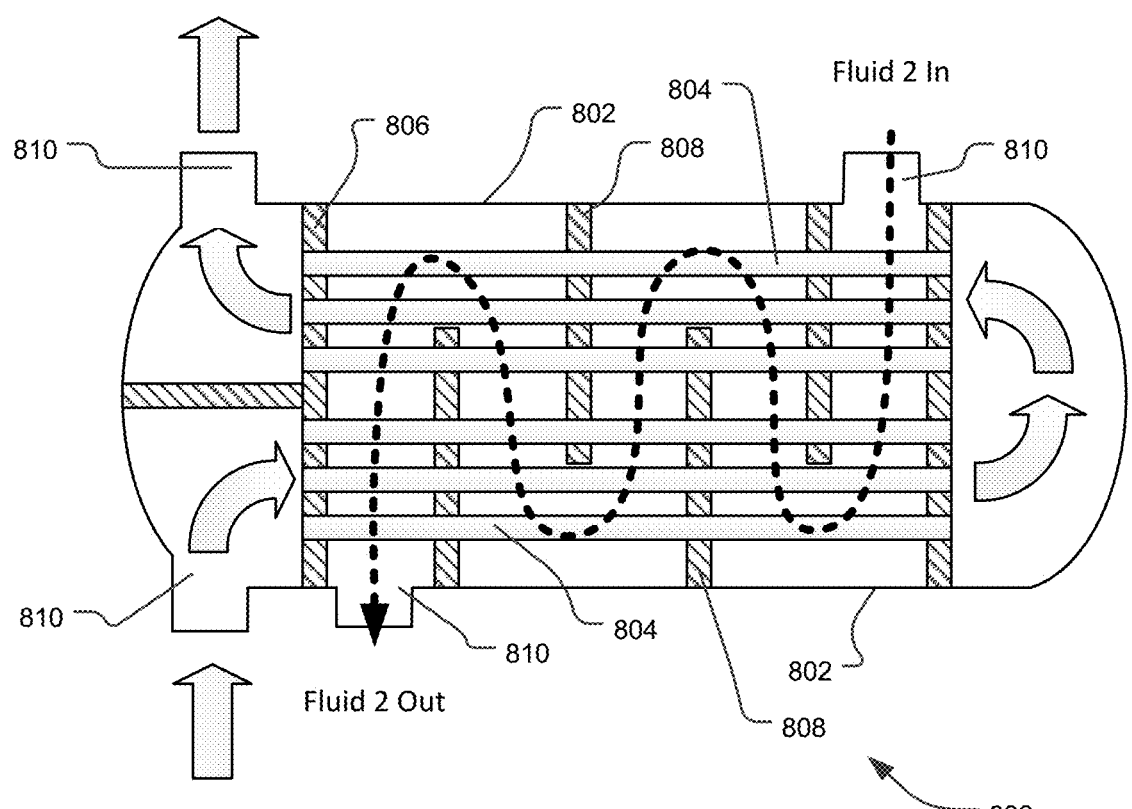
FIG. 16 illustrates a shell and tube heat exchanger configured with a shell.

Heat exchanger shells, tubes, and tube sheets are another example of process equipment components that could be manufactured out of the steel embodiments described above. FIG. 16 illustrates a shell and tube heat exchanger configured with a shell. The exchanger 800 includes a shell 802, a set of U-shaped tubes 804, a tube sheet 806, a number of baffles 808 and various access ports 810. Any and all of these components could be manufactured from the high temperature, radiation-resistant steel embodiments described above. In addition, FIG. 16 is but one type of heat exchanger and the steel embodiments disclosed herein are suitable for any heat exchanger design such as, for example, air-cooled heat exchangers, double-pipe heat exchangers, and plate-and-frame heat exchangers.

Figure 17:
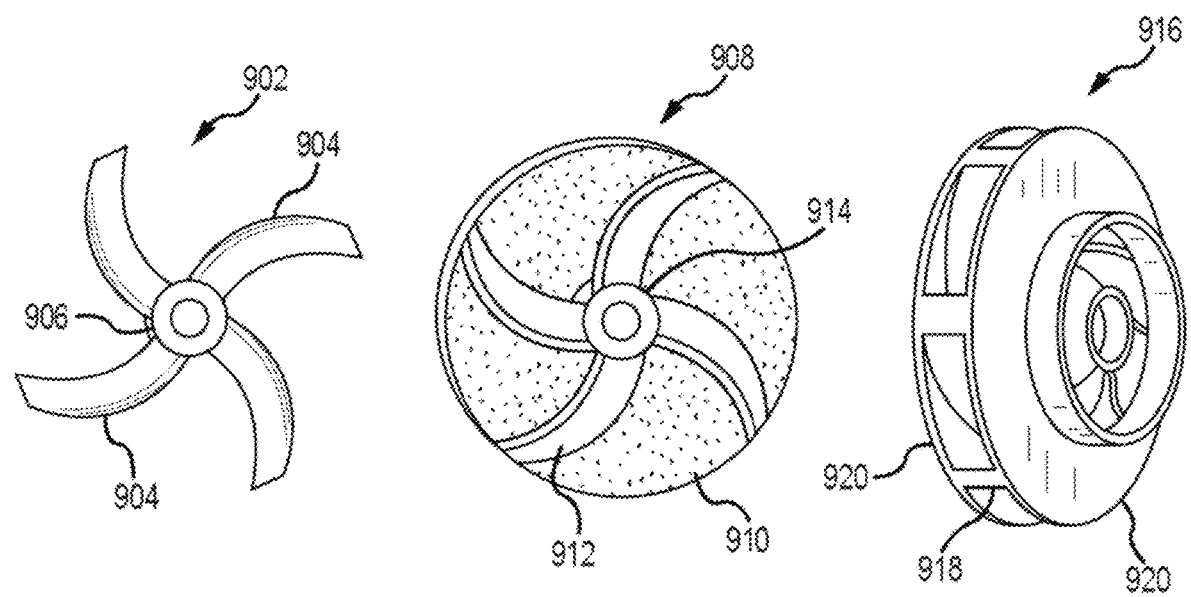
FIG. 17 illustrates embodiments of open, semi-open and closed impellers.

Pump impellers are another example of a piece of process equipment that could be manufactured out of the steel embodiments described above. In some nuclear reactor designs, pump impellers may be within a reactor core and subjected to high doses of radiation. FIG. 17 illustrates embodiments of open, semi-open and closed impellers. The open impeller 902 consists only of blades 904 attached to a hub 906. The embodiment of the semi-open impeller 908 is constructed with a circular plate 910 attached to one side of the blades 912 and hub 914. The closed impeller 916 has circular plates 920 attached on both sides of the blades 918. FIG. 17 illustrates only a few representative embodiments of impeller designs, but it will be understood that the steel embodiments disclosed herein are suitable for any impeller design such as, for example, vortex impellers, centrifugal screw impellers, propellers, shredder impellers, closed channel impellers, mixed flow impellers, radial impellers, semi-axial impellers and axial impellers.

Figure 18:
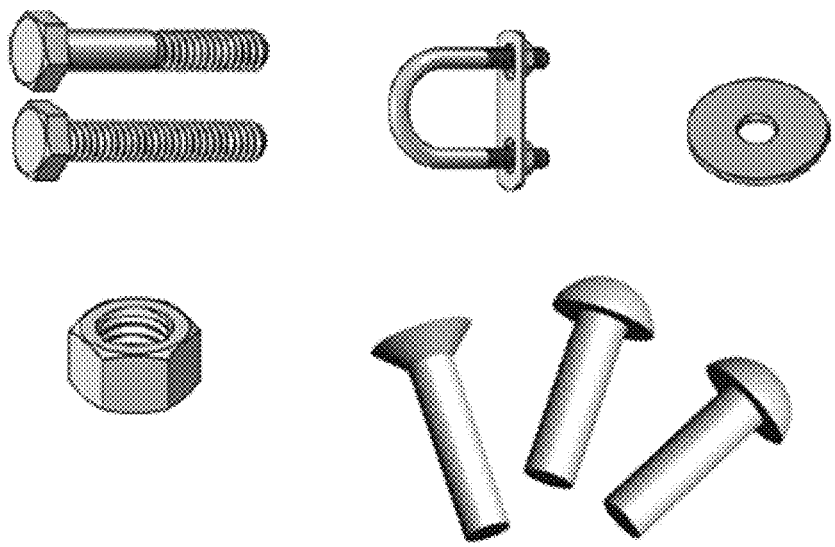
FIG. 18 illustrates structural members and fastening components that could be manufactured out of the steel embodiments described above.

Structural members and fasteners are yet other examples of components that could be manufactured out of the steel embodiments described above. Nuts, bolts, U-bolts, washers, and rivets, examples of which are shown in FIG. 18, made of the steel embodiments disclosed herein would be particularly useful in high temperature environments and also in high radiation dose environments.

Figure 19:
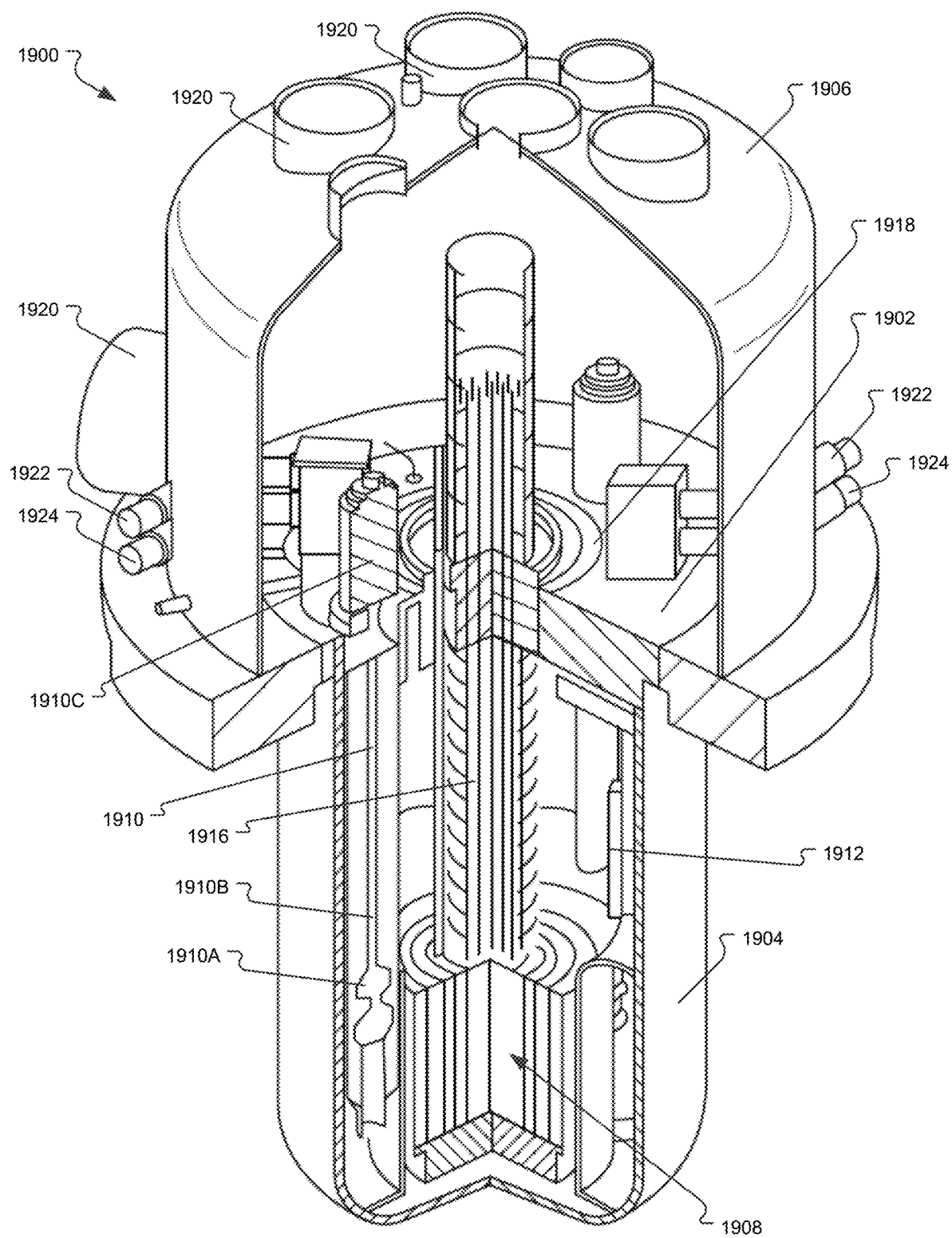
FIG. 19 illustrates an embodiment of a traveling wave reactor.

FIG. 19 illustrates an embodiment of a traveling wave reactor illustrating a number of steel components whose performance would be improved when made using the techniques described above. FIG. 19 identifies many of the main steel components of the traveling wave reactor, such as the reactor head, reactor vessel, guard vessel, and containment dome but also illustrates many ancillary reactor components such as structural members, flanges, cover plates, piping, railing, framing, connecting rods, and supports. Any of the reactor components illustrated in FIG. 19, and especially those components located within or near the reactor core, could be manufactured using embodiments of the methods described above.

The traveling wave reactor 1900 is designed to hold a number of nuclear fuel pins in a reactor core 1908 located at the bottom of the reactor and guard vessel 1904. The reactor head 1902 seals the radioactive materials within the reactor and guard vessel 1904. In the embodiment shown the reactor core 1908 can only be accessed through the reactor head 1902. For example, an in-vessel fuel handling machine 1916 is provided. The fuel handling machine 1916 allows fuel pins and other instruments to be lifted from the core 1908 and removed from the vessel via a set of large and small rotating plugs 1918 located in the reactor head 1902. This design allows the vessel 1904 to be unitary and without any penetrations.

A thermal shield may also be provided beneath the reactor head 1902 to reduce the temperature in the area in the containment dome 1906 above the reactor head 1902. This area may be accessed by one or more hatches 1920 in the containment dome 1906 as shown. Additional access hatches may also be provided in different locations within containment dome 1906 as shown.

Sodium, which is a liquid at operating temperatures, is the primary coolant for removing heat from the reactor core 1908. The reactor and guard vessel 1904 is filled to some level with sodium which is circulated through the reactor core 1908 using pumps 1910. Two sodium pumps 1910 are provided. Each pump 1910 includes an impeller 1910A located adjacent to the reactor core 1908, connected by a shaft 1910B which extends through the reactor head 1902 to a motor 1910C located above the reactor head 1902.

The pumps 1910 circulate the sodium through one or more intermediate heat exchangers 1912 located within the reactor and guard vessel 1904. The intermediate heat exchangers 1912 transfers heat from the primary sodium coolant to a secondary coolant. Fresh secondary coolant is piped through the containment dome 1906 (via one or more secondary coolant inlets 1922) and the reactor head 1902 to the intermediate heat exchangers 1912 where it is heated. Heated secondary coolant then flows back through the reactor head 1902 and out the containment dome 1906 in one or more secondary coolant outlets 1924. In an embodiment, the heated secondary coolant is used to generate steam which transferred to a power generation system. The secondary coolant may be a sodium coolant or some other salt coolant such as a magnesium sodium coolant.

Notwithstanding the appended claims, the disclosure is also defined by the following clauses:

1. A method for homogenizing a steel composition comprising:

melting a plurality of components to make the steel composition having an austenitic phase temperature range having an upper limit, each component having a diffusivity;

heating the steel composition to a first temperature within the upper half of the pure austenitic phase temperature range;

maintaining the steel composition at the first temperature for a first period of time determined based on the diffusivity in the austenitic phase of the steel composition of at least one of the plurality of components; and working the steel composition.

2. The method of clause 1, wherein the first temperature is selected to be within the upper 25%, upper 20%, upper 15%, upper 10%, upper 5% or the upper 1% of the austenitic phase temperature range.

3. The method of clause 1 or 2, wherein the first temperature is selected to be 5, 10, 15, or 20° C. less than the upper limit of the calculated austenitic phase temperature range.

4. The method of any of the above clauses further comprising:

calculating the first period of time based on a desired diffusion distance and a diffusivity of one of the plurality of components.

5. The method of any of the above clauses further comprising:

calculating the first period of time, t, at least in part, using the following equation:

$$d = \sqrt{D \cdot e^{-Q/kT} \cdot t}$$

where d is a predetermined desired diffusion distance of a selected component, T is the first temperature, D is a diffusion coefficient for the selected component in austenitic phase iron (γ-Fe), Q is an activation energy of the selected component in γ-Fe, and k is Boltzmann's constant.

6. The method of any of the above clauses further comprising:

observing an inhomogenous distribution of a first component in the steel composition prior to the heating operation; and wherein calculating the first period of time further comprises selecting the inhomogenously distributed first component for use in the calculating operation.

7. The method of any of the above clauses further comprising:

determining a characteristic distance of an inhomogenous distribution of the first component in the steel composition prior to the heating operation; and wherein calculating the first period of time further comprises selecting a desired diffusion distance, d, based on the characteristic distance of the inhomogenous distribution.

8. The method of any of the above clauses, wherein calculating the first period of time further comprises:

determining a characteristic distance, B, of the inhomogenous distribution of the first component in the steel composition prior to the heating operation; and wherein calculating the first period of time further comprises selecting a desired diffusion distance, d, based on a desired ratio of d/B.

9. The method of clause 8, wherein the desired ratio of d/B is from a lower bound of d/B≥0.75, ≥0.9, ≥1.0, ≥1.1, ≥1.25, ≥1.5, ≥2.0, or ≥2.5 and to an upper bound of d/L≤10.0, ≤5.0, ≤4.0, ≤2.5, ≤2.0 or ≤1.5.

10. The method of any of the above clauses, wherein the first period of time is selected based on the resulting grain size of austenite in the steel composition created during the maintain operation.

11. The method of any of the above clauses, wherein the first period of time is selected to achieve a steel composition that has no austenite grains larger than 1000 μm, 500 μm, 100 μm, or 50 μm in their longest axis.

12. A steel product made by the method of any of the above clauses.

13. A method for homogenizing a steel element made of a steel composition comprising:

inspecting a first steel element of the steel composition;

observing an inhomogenous distribution in the first steel element of at least a first component of the steel composition;

determining a characteristic distance for the inhomogenous distribution;

selecting a homogenization temperature within the austenite phase temperature range for the steel composition;

calculating a homogenization hold time based on the characteristic distance for the inhomogenous distribution, a diffusivity of the first component in the steel composition, and the selected homogenization temperature;

heating second steel elements of the steel composition to the homogenization temperature; and maintaining the second steel elements at the homogenization temperature for a first period of time based on the homogenization hold time.

14. The method of clause 13, wherein observing an inhomogenous distribution in the first steel element includes identifying regions of different concentrations of the first component within the first steel element.

15. The method of clause 13 or 14, wherein determining a characteristic distance for the inhomogenous distribution further comprises:

measuring a distance between the regions of different concentration of the first component within the first steel element.

16. The method of any of clauses 13-15, wherein determining a characteristic distance for the inhomogenous distribution further comprises:

measuring a plurality of distances between regions of high concentration of the first component within the first steel element;

selecting an average distance between the regions of high concentration; and using the average distance as the characteristic distance.

17. The method of any of clauses 13-16 further comprising:

working, after the maintaining operation, the second steel elements into one or more steel products.

18. The method of any of clauses 13-17, wherein determining a characteristic distance for the inhomogenous distribution includes determining a characteristic distance, B, of the inhomogenous distribution of the first component and calculating a homogenization hold time further comprises selecting a desired diffusion distance, d, based on a desired ratio of d/B.

19. The method of clause 18, wherein the desired ratio of d/B is from a lower bound of d/B≥0.75, ≥0.9, ≥1.0, ≥1.1, ≥1.25, ≥1.5, ≥2.0, or ≥2.5 and to an upper bound of d/L≤10.0, ≤5.0, ≤4.0, ≤2.5, ≤2.0 or ≤1.5.

20. An article of manufacture containing steel made via the method of any of clauses 13-19.

It will be clear that the systems and methods described herein are well adapted to attain the ends and advantages mentioned as well as those inherent therein. While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method for homogenizing a steel composition made of a plurality of chemical elements comprising:

melting the plurality of chemical elements to make the steel composition having an austenitic phase temperature range having an upper limit, each chemical element having a diffusivity within in the austenitic phase of the steel composition;

heating the steel composition to a first temperature within the upper half of the austenitic phase temperature range;

calculating a first period of time, t, using the following equation:

$$d = \sqrt{D \cdot e^{-Q/kT} \cdot t}$$

where d is a predetermined target diffusion distance of a selected one of the plurality of chemical elements, T is the first temperature, D is a diffusion coefficient for the selected one of the plurality of chemical elements in austenitic phase iron (γ-Fe), Q is an activation energy of the selected one of the plurality of chemical elements in γ-Fe, and k is Boltzmann's constant;

maintaining the steel composition at the first temperature for a first period of time calculated using the diffusivity in the austenitic phase of the steel composition of at least one of the plurality of chemical elements; and working the steel composition.

2. The method of claim 1, wherein the first temperature is within the upper 25% of the austenitic phase temperature range.

3. The method of claim 1, wherein the first temperature is from 5-20° C. less than the upper limit of the austenitic phase temperature range.

4. The method of claim 1, further comprising:

calculating the first period of time to achieve a target diffusion distance based on the diffusivity of least diffusive one of the plurality of chemical elements.

5. The method of claim 1 further comprising:

identifying an inhomogenous distribution in the form of high-density bands of a first chemical element in the steel composition prior to the heating operation; and wherein calculating the first period of time further comprises selecting the inhomogenously distributed first chemical element as the selected one of the plurality of chemical elements for use in the calculating operation.

6. The method of claim 5 further comprising:
determining a characteristic distance between high-density bands in the inhomogenous distribution of the first chemical element in the steel composition prior to the heating operation; and
wherein calculating the first period of time further comprises selecting a target diffusion distance, d, from 0.5 to 10.0 times the characteristic distance of the inhomogenous distribution.

7. The method of claim 5, wherein calculating the first period of time further comprises:
determining a characteristic distance, B, between high-density bands in the inhomogenous distribution of the first chemical element in the steel composition prior to the heating operation; and
wherein calculating the first period of time further comprises selecting a target diffusion distance, d, so that the ratio of d/B is from d/B≥0.5 to d/B≤10.0.

8. The method of claim 7, wherein the target ratio of d/B is from d/B≥0.75 to d/B≤5.0.

9. The method of claim 1, wherein the first period of time is selected based on both the resulting grain size of austenite in the steel composition created during the maintaining operation and on the diffusivity in the austenitic phase of the steel composition of the selected one of the plurality of chemical elements.

10. The method of claim 1, wherein the first period of time is selected based on the diffusivity in the austenitic phase of the steel composition of the selected one of the plurality of chemical elements to achieve a steel composition that has no austenite grains larger than 1000 μm in their longest axis.

11. A method for homogenizing a steel ingot made of a steel composition comprising:
inspecting a first steel ingot of the steel composition;
identifying an inhomogenous distribution in the form of high-density regions of a first chemical element in the first steel ingot;
determining a characteristic distance between the high-density regions of the first chemical element;
selecting a homogenization temperature within the austenite phase temperature range for the steel composition;
calculating a homogenization hold time, t, using the following equation:

$$d = \sqrt{D \cdot e^{-Q/kT} \cdot t}$$

where d is a predetermined target diffusion distance of a selected one of the plurality of chemical elements, T is the homogenization temperature, D is a diffusion coefficient for the first chemical element in austenitic phase iron (γ-Fe), Q is an activation energy of the first chemical element in γ-Fe, and k is Boltzmann's constant;
heating second steel ingots of the steel composition to the homogenization temperature; and
maintaining the second steel ingots at the homogenization temperature for at least the homogenization hold time.

12. The method of claim 11, wherein observing an inhomogenous distribution in the first steel ingot includes identifying regions of different concentrations of the first chemical element within the first steel ingot.

13. The method of claim 11, wherein determining a characteristic distance for the inhomogenous distribution further comprises:
measuring a distance between the regions of different concentration of the first chemical element within the first steel ingot.

14. The method of claim 11, wherein determining a characteristic distance for the inhomogenous distribution further comprises:
measuring a plurality of distances between regions of high concentration of the first chemical element within the first steel ingot;
determining an average distance between the regions of high concentration; and
using the average distance as the characteristic distance.

15. The method of claim 11 further comprising:
working, after the maintaining operation, the second steel ingots into one or more steel products.

16. The method of claim 11, wherein determining a characteristic distance for the inhomogenous distribution includes determining a characteristic distance, B, of the inhomogenous distribution of the first chemical element and calculating a homogenization hold time further comprises selecting a target diffusion distance, d, so that the ratio of d/B is from d/B≥0.5 to d/B≤10.0.

17. The method of claim 16, wherein the desired ratio of d/B is from a lower bound of d/B≥0.75 to an upper bound of d/B≤10.0.

18. The method of claim 5 wherein the characteristic distance between the high-density bands of the first chemical element is the average distance between the high-density bands of the first chemical element in the first steel ingot.

19. The method of claim 11 wherein the characteristic distance between the high-density regions of the first chemical element is the average distance between the high-density regions of the first chemical element in the first steel ingot.

* * * * *